US008748058B2

(12) United States Patent
Venkataraman

(10) Patent No.: US 8,748,058 B2
(45) Date of Patent: Jun. 10, 2014

(54) PEROVSKITE-LIKE STRUCTURES

(75) Inventor: Thangadurai Venkataraman, Calgary (CA)

(73) Assignee: UTI Limited Partnership, Calgary (CA)

( * ) Notice: Subject to any disclaimer, the term of this patent is extended or adjusted under 35 U.S.C. 154(b) by 937 days.

(21) Appl. No.: 12/922,102

(22) PCT Filed: Mar. 13, 2009

(86) PCT No.: PCT/IB2009/005448
§ 371 (c)(1),
(2), (4) Date: Dec. 14, 2010

(87) PCT Pub. No.: WO2009/112953
PCT Pub. Date: Sep. 17, 2009

(65) Prior Publication Data
US 2011/0086289 A1     Apr. 14, 2011

Related U.S. Application Data

(60) Provisional application No. 61/036,244, filed on Mar. 13, 2008.

(51) Int. Cl.
*H01M 8/10* (2006.01)
(52) U.S. Cl.
USPC .......................................................... 429/495
(58) Field of Classification Search
None
See application file for complete search history.

(56) References Cited

U.S. PATENT DOCUMENTS

| 4,404,068 | A | 9/1983 | Huggins et al. ................ 205/412 |
| 4,957,673 | A | 9/1990 | Schroeder et al. ............. 264/643 |
| 5,057,362 | A | 10/1991 | Schroeder et al. ......... 428/312.2 |
| 5,133,857 | A | 7/1992 | Alberti et al. ................. 204/425 |
| 5,308,601 | A | 5/1994 | Hampden-Smith et al. .......................... 423/593.1 |
| 5,382,481 | A | 1/1995 | Fleischer ...................... 429/304 |
| 5,520,789 | A | 5/1996 | Takahashi et al. ............. 204/424 |
| 2005/0241477 | A1 | 11/2005 | Mundschau et al. .............. 95/56 |
| 2005/0252853 | A1 | 11/2005 | Berland et al. ........... 210/500.25 |

FOREIGN PATENT DOCUMENTS

| WO | WO 2005/101428 | 10/2005 |
| WO | WO 2008/153585 | 12/2008 |

OTHER PUBLICATIONS

Adler, "Factors governing oxygen reduction in solid oxide fuel cell cathodes," *Chem. Rev.*, 104:4791-4844, 2004.
Azad and Irvine, "High density and low temperature sintered proton conductor BaCe0.5Zr0.35Sc0.1Zn0.05O3—δ," *Solid State Ionics*, 179:678-682, 2008.
Azad and Irvine, "Synthesis, chemical stability and proton conductivity of the perovksites Ba(Ce,Zr)1—x Scx O3—δ," *Solid State Ionics*, 178:635-340, 2007.
Badwal, "Grain boundary resistivity in zirconia-based materials: effect of sintering temperatures and impurities," *Solid Sate Ionics*, 76:67-80, 1995.

(Continued)

*Primary Examiner* — Patrick Ryan
*Assistant Examiner* — Wyatt McConnell
(74) *Attorney, Agent, or Firm* — Fulbright & Jaworski LLP

(57) ABSTRACT

A Perovskite-like structure and its device applications are disclosed. One Perovskite-like structure disclosed includes a compound having an empirical chemical formula $[A(B_y C_{1-y})O_z]_x$, where x, y, and z are numerical ranges. In select embodiments, A comprises one or more divalent metal ions, B comprises one or more monovalent metal ions, C comprises one or more pentavalent metal ions, O is oxygen; and wherein $x \geq 1$, $0.1 \leq y \leq 0.9$, $2.5 \leq z \leq 3$, and wherein the net charge of A is +2, and the net charge Of $(B_y C_{1-y})$ is +4.

41 Claims, 24 Drawing Sheets

(56) References Cited

OTHER PUBLICATIONS

Bhella and Thangadurai, "Synthesis and characterization of carbon dioxide and boiling water stable proton conducting double perovskite-type metal oxides," *J. Power Sources*, 186:311-319, 2009.
Bhide and Virkar, "Stability of AB1/2B1/2O3—Type Mixed Perovskite Proton Conductors," *J. Electrochem. Soc.*, 146:4386-4392, 1999.
Bhide and Virkar, "Stability of BaCeO3—Based Proton Conductors in Water-Containing Atmospheres," *J. Electrochem.. Soc.*, 146:2038-2044, 1999.
Bohn et al., "The high-temperature proton conductor Ba3Ca1.18Nb1.82O9-δI. Electrical conductivity," *Solid State Ionics*, 117: 219-228, 1999.
Bonanos "Oxide-based protonic conductors: point defects and transport properties," *Solid State Ionics*, 145:265-274, 2001.
Carrillo-Cabrera and Wagner, "The effect of high temperature pre-annealing on the electrical conductivity of polycrystalline nickel oxide at intermediate temperatures," *Solid State Ionics*, 28-30: 1396-1401, 1988.
Chowdry et al., "New inorganic proton conductors," *Mat. Res. Bull.*, 17: 917-933, 1982.
Coors, "Protonic ceramic fuel cells for high-efficiency operation with methane," *J. Power Sources*, 118: 150-156, 2003.
Ding et al., "Low-temperature protonic ceramic membrane fuel cells (PCMFCs) with SrCo0.9Sb0.1O3—δ cubic perovskite cathode," *J. Power Sources*, 185:937-940, 2008.
Dunyushkina and Adler, "Influence of Electrolyte Surface Planarization on the Performance of the Porous SOFC Cathodes," *J. Electrochem Soc.*, 15:A2040-A2045, 2005.
Haavik et al., "Temperature dependence of oxygen ion transport in Sr+Mg-substituted LaGaO3 (LSGM) with varying grain sizes," *Solid State Ionics*, 174:233-242, 2004.
Hammouche et al., "Crystallographic, thermal and electrochemical properties of the system La1—xSrxMnO3 for high temperature solid electrolyte fuel cells," *Mater. Res. Bul.*, 24:367-380, 1989.
Hashimoto et al., "A study of Pr0.7Sr0.3Fe1—xNixO3—δ as a cathode material for SOFCs with intermediate operating temperature," *Solid State Ionics*, 176:1013-1020, 2005.
Haugsrud and Norby, "Proton conduction in rare-earth ortho-niobates and ortho-tantalates," 5:193-196, 2006.
Huang et al., "An Examination of LSM-LSCo Mixtures for Use in SOFC Cathodes," *J. Electrochem. Soc.*, 153: A951-A955, 2006.
Huang et al., "Characterization of Sr-Doped LaMnO3 and LaCoO3 as Cathode Materials for a Doped LaGaO3 Ceramic Fuel Cell," *J Electrochem. Soc.*, 143:3630-3636, 1996.
International Search Report and Written Opinion issued in PCT/IB2009/005448, dated Sep. 9, 2009.
Iguchi et al., "The influence of grain structures on the electrical conductivity of a BaZr0.95Y0.05O3 proton conductor," *Solid State Ionics*, 177:2381-2384, 2006.
Ishihara et al., "Intermediate Temperature Solid Oxide Fuel Cells Using a New LaGaO3 Based Oxide Ion Conductor," *J. Electrochem. Soc.*, 145:3177-3183, 1998.
Iwahara et al., "Prospect of hydrogen technology using proton-conducting ceramics," *Solid State Ionics*, 168:299-310, 2004.
Iwahara et al., "Proton conducting ceramics and their applications," *Solid State Ionics*, 89-88:9-15, 1996.
Iwahara et al., "Proton conduction in sintered oxides and its application to steam electrolysis for hydrogen production," *Solid State Ionics*, 3-4:359-363, 1981.
Iwahara et al., "Technological challenges in the application of proton conducting ceramics," *Solid State Ionics*, 77:289-298, 2005.
Kreuer, "Proton-conducting oxides," *Annu. Rev. Mater. Res.*, 33:333-359, 2003.
Kreur, "Proton Conductivity: Materials and Applications," *Chem. Mater.*, 8:610-641, 1996.
Li et al., "Electrical properties of Mg-doped Gd0.1Ce0.9O1.95 under different sintering conditions," *J. Power Sources*, 183:498-505, 2008.

Murray et al., "Oxygen transfer processes in (La,Sr)MnO3/Y2O3-stabilized ZrO2 cathodes: an impedance spectroscopy study," *Solid State Ionics*, 110:235-243, 1998.
Norby, "Solid-state protonic conductors: principles, properties, progress and prospects," *Solid State Ionics*, 125:1-11, 1999.
Nowick et al., "Some factors that determine proton conductivity in nonstoichiometric complex perovskites," *Solid State Ionics*, 125: 303-311, 1999.
Pearce and Thangadurai, "Structural and electrochemical characterization of Ce0.85Ca0.05Sm0.1O1.9 oxide ion electrolyte with Sr-doped LaMnO3 and SmCoO3 cathodes," *Ionics*, 14:483-489, 2008.
Schober et al., "Criteria for the application of high temperature proton conductors in SOFCs," *Solid State Ionics*, 97:369-373, 1997.
Schober et al., "The high temperature proton conductor Ba3Ca1.18Nb1.82O9-δ Part II: electrochemical cell measurements and TEM," *Solid State Ionics*, 118:173-178, 1999.
Schober et al., "Water vapor solubility and eltrochemical characterization of the high temperature proton conductor BaZr0.9Y0.1O2.95," *Solid State Ionics*, 127: 351-360, 2000.
Sha et al., "Influence of the sintering temperature on electrical property of the Ce0.8Sm0.1Y0.1O1.9 electrolyte," *J. Alloys and Compounds*, 433: 274-278, 2007.
Sho and Haile, "A high-performance cathode for the next generation of solid-oxide fuel cells," *Nature*, 431: 170-173, 2004.
Skinner et al., "Recent advances in perovskite-type materials for SOFC cathodes," *Fuel Cells Bulletin*, 4:6-12, 2001.
Tanner and Virkar, "Instability of BaCeO3 in H2O-Containing Atmospheres," *J. Electrochem. Soc.*, 143: 1386-1389, 1996.
Tao and Irvine, "A Stable, Easily Sintered Proton-Conducting Oxide Electrolyte for Moderate-Temperature Fuel Cells and Electrolyzers," *Adv. Mater.*, 18: 1581-1584, 2006.
Thangadurai and Weppner, "Electrical Properties of A 'Ca2Nb3O10 (A=K, Rb, Cs) Layered Perovskite Ceramics," *Ionics*, 7:22-31, 2001.
Thangadurai and Weppner, "Li0.3Sr0.6B0.5Ti0.5O3 (B=Nb, Ta) and Li0.3Sr0.6Ta0.5Ti0.5—xFexO3 (0<x<0.3): Novel Perovskite-Type Materials for Monolithic Electrochromic Devices," *J. Electrochem. Soc.*, 151:H1-H6, 2004.
Thangadurai and Weppner, "Mixed potential protonic-electronic conductivity in the Dion-Jacobson-type layered perovskites in hydrogen containing atmosphere and their application in ammonia sensors," *Solid State Ionics*, 175-183, 2004.
Thangadurai, "A note on a conjecture of Borwein and Choi," *Arch. Math.*, 78:386-396, 2002.
Tian and Chan, "Ionic conductivities, sintering temperatures and microstructures of bulk ceramic CeO2 doped with Y2O3," *Solid State Ionics*, 134:89-102, 2000.
Tu et al, "Ln1—xSrxCoO3(Ln=Sm, Dy) for the electrode of solid oxide fuel cells," *Solid State Ionics*, 100:283-288, 1997.
Uchida et al, "Relation between proton and hole conduction in SrCeO3-based solid electrolytes under water-containing atmospheres at high temperatures," *Solid State Ionics*, 11:117-124, 1983.
Valkenberg et al., "The electrical conductivity of the high temperature proton conductor Ba3Ca1.18Nb1.82O9-δ," *Solid State Ionics*, 97:511-515, 1997.
Wang and Virkar, "Estimation of the Chemical Diffusion Coefficient of H2O in Ba3Ca1.18Nb1.82O(9—) from Conductivity Measurements," *J. Electrochem. Soc.*, 150: A92-A97, 2003.
Wu et al., "Sm0.5Sr0.5CoO3—δ—BaCe0.8Sm0.2O3-δ composite cathodes for proton-conducting solid oxide fuel cells," *Solid State Ionics*, 179: 1505-1508, 2008.
Xia and Liu, "Low-temperature SOFCs based on Gd0.1Ce0.9O1.95 fabricated by dry pressing," *Solid State Ionics*, 144:249-255, 2001.
Xia et al., "Reduced-Temperature Solid Oxide Fuel Cells Fabricated by Screen Printing," *Electrochem. Solid-State Lett.*, 4(5): A52-A54, 2001.
Xia et al., "Sm0.5Sr0.5CoO3 cathodes for low-temperature SOFCs," *Solid State Ionics*, 149: 11-19, 2002.
Yamamoto et al., "Perovskite-type oxides as oxygen electrodes for high temperature oxide fuel cells," *Solid State Ionics*, 22:241-249, 1987.

(56) References Cited

OTHER PUBLICATIONS

Yoshida et al., "Sintering behavior of Ln-doped ceria compounds containing Gallia," *J. Power Sources*, 106:136-141, 2002.

Zhang et al., "Grain boundary conduction of Ce0.9Gd0.1O2—δ ceramics derived from oxalate coprecipitation: effects of Fe loading and sintering temperature," *Solid State Ionics*, 176: 377-384, 2005.

Zhang et al., "Interfacial resistances of Ni—BCY mixed-conducting membranes for hydrogen separation," *Solid State Ionics*, 159:121-134, 2003.

Zhong et al., "Stability and conductivity study of the BaCe0.9—xZrxY0.1O2.95 systems," *Solid State Ionics*, 178:213-220, 2007.

Zimmer et al., "Preparation of the high temperature proton conductor Ba3Ca1.18Nb1.82O8.73 via a wet chemical route," *Solid State Ionics*, 97:505-509, 1997.

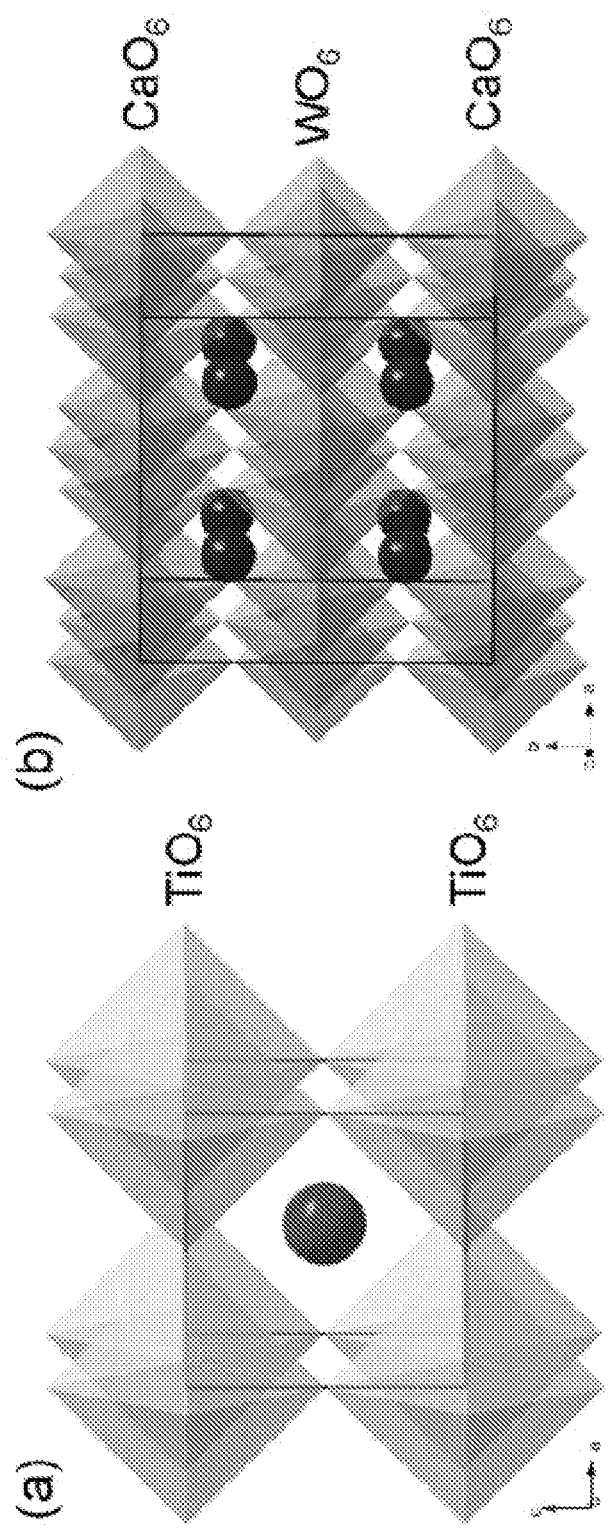
FIGS. 6a-b

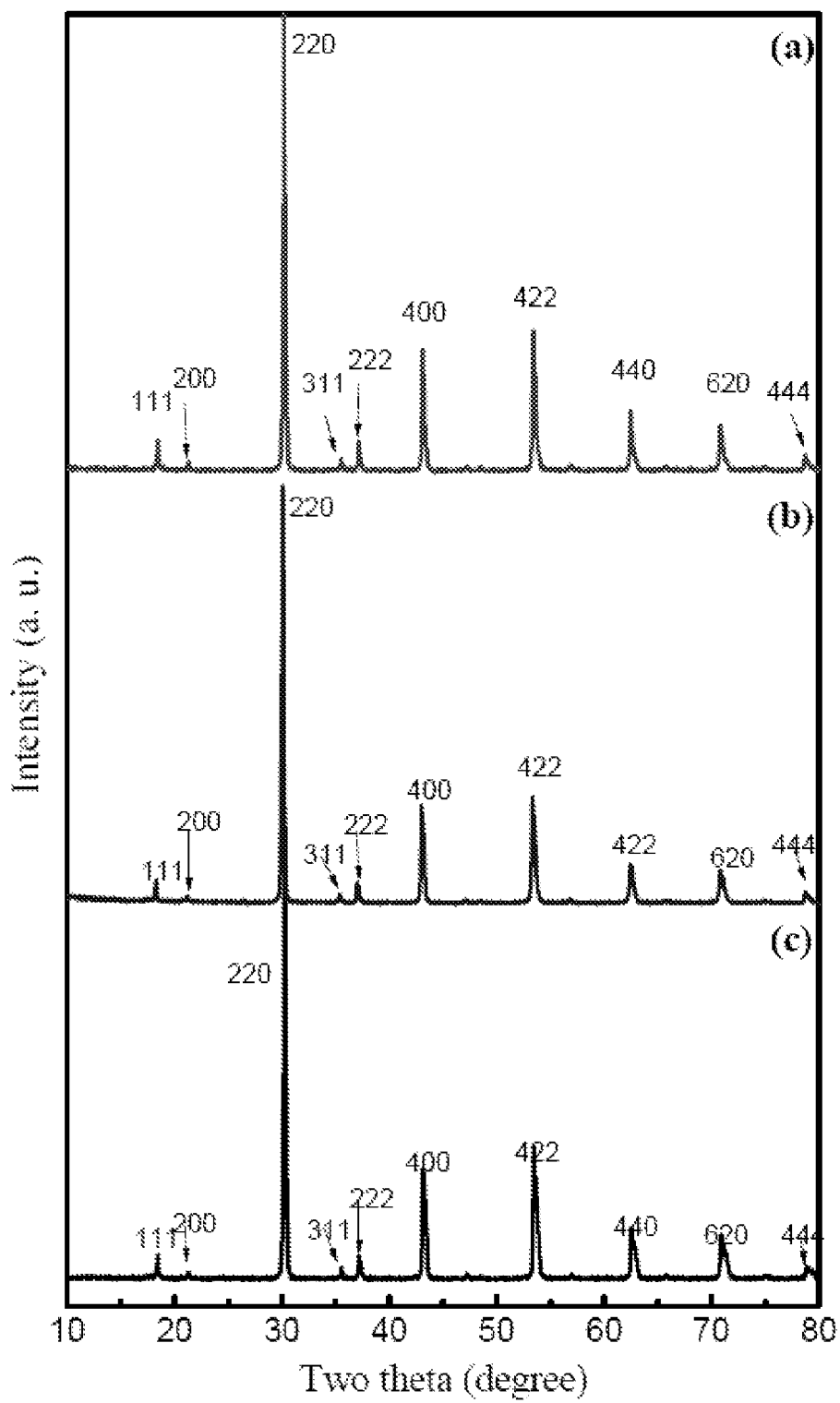
FIGS. 7a-c

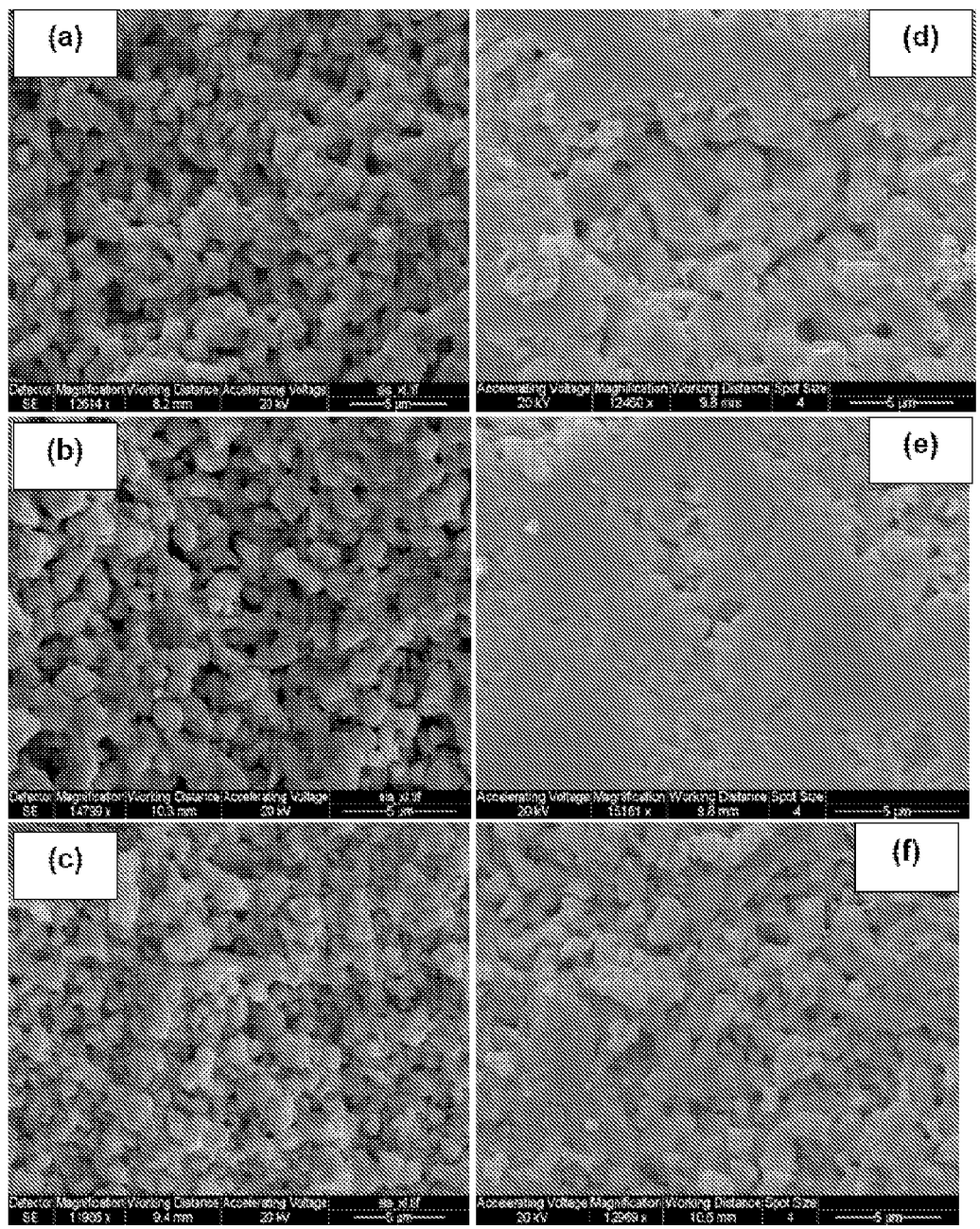
FIGS. 8a-f

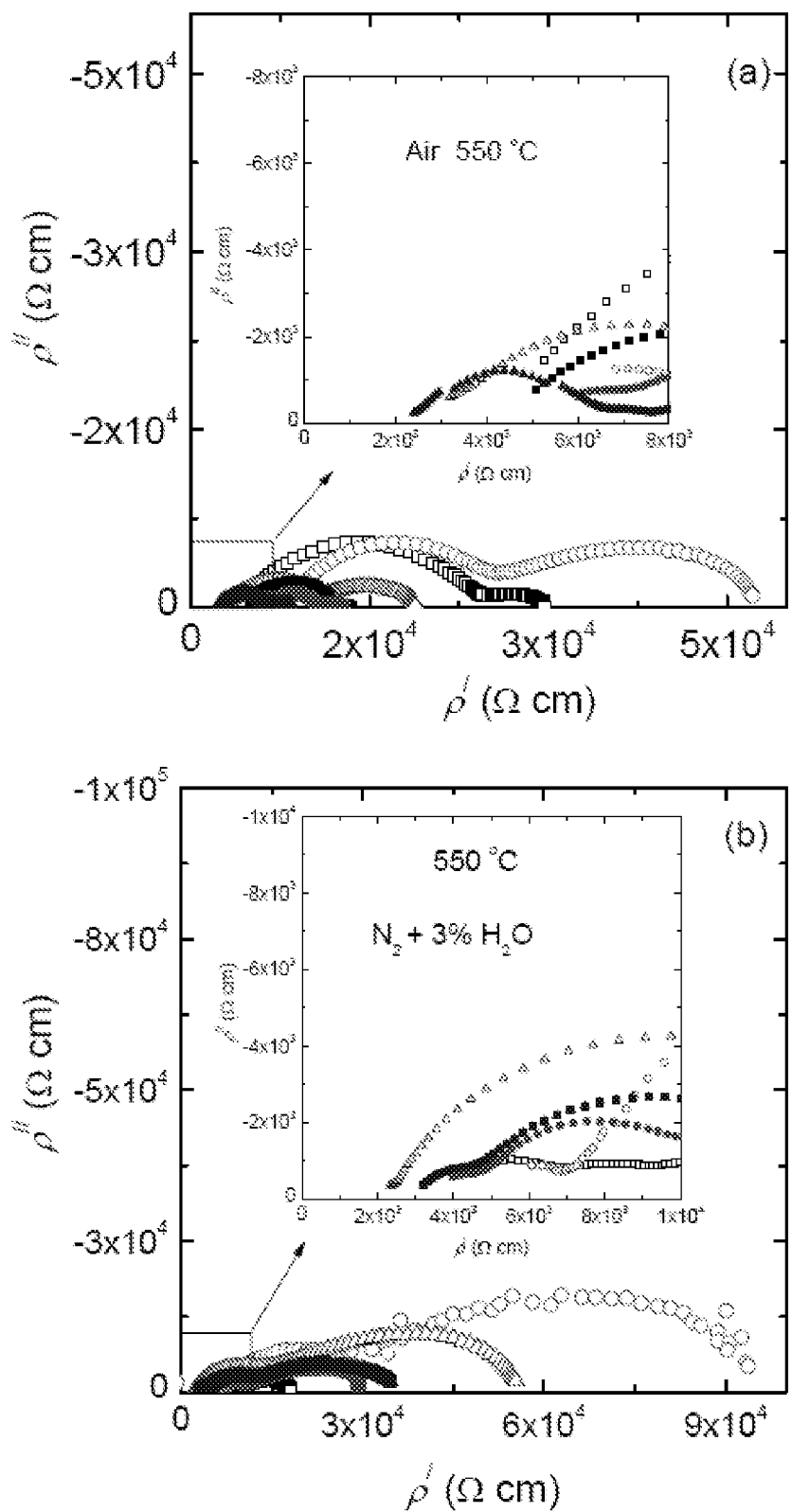
FIGS. 9a-b

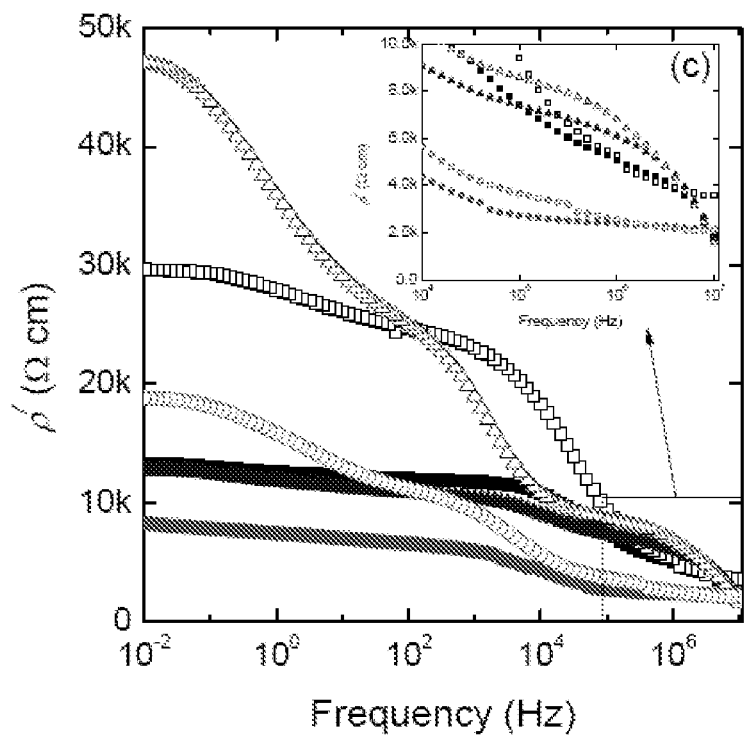
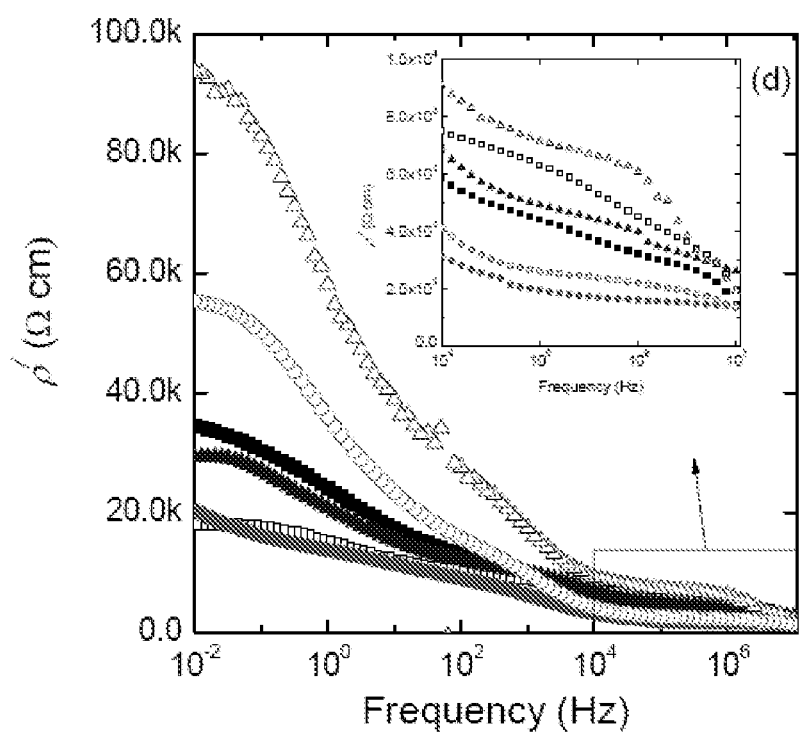
FIGS. 9c-d

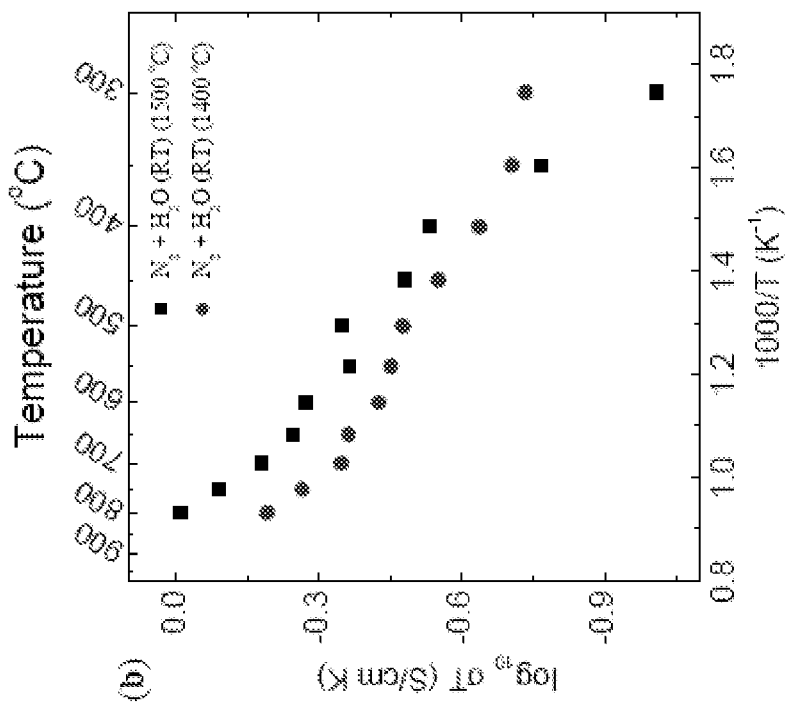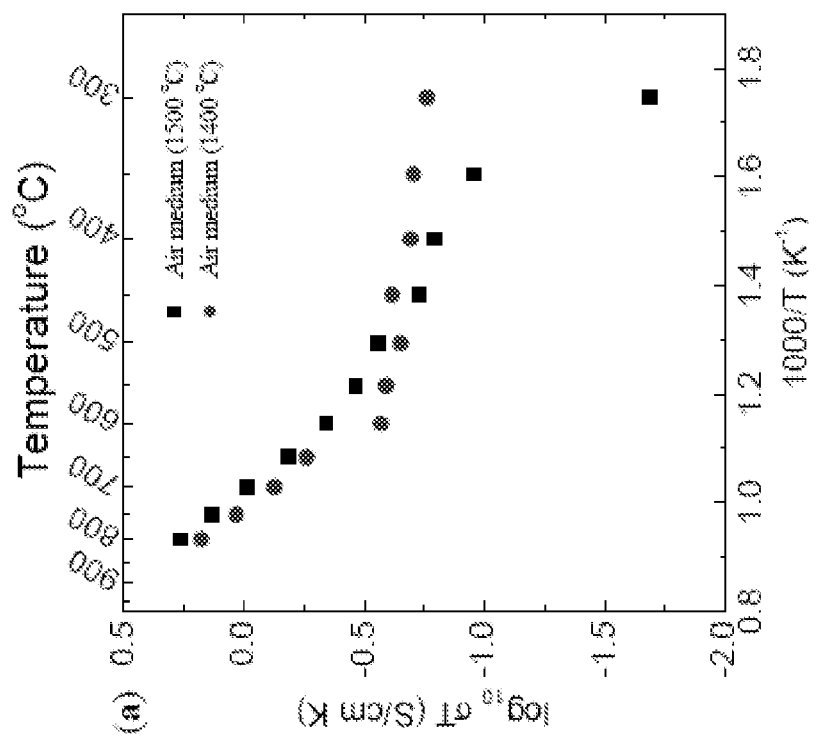
FIGS. 10a-b

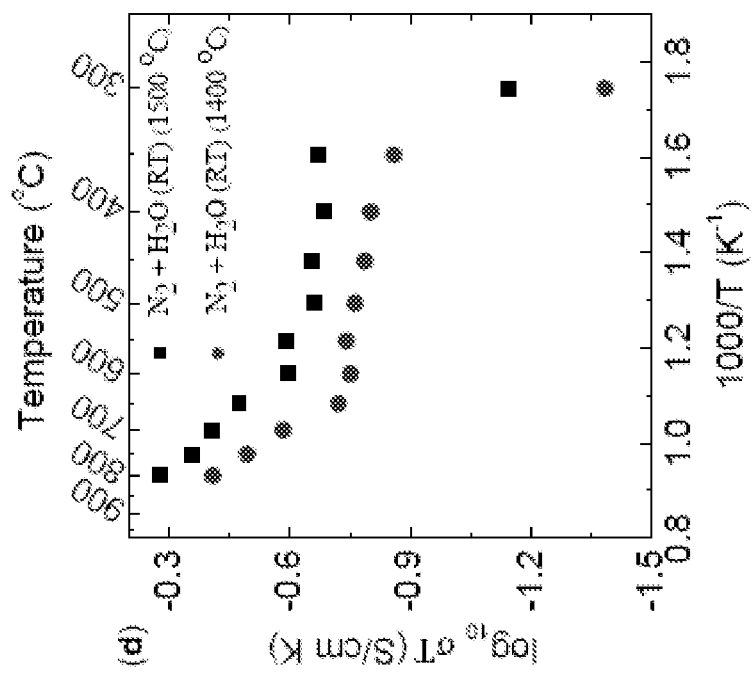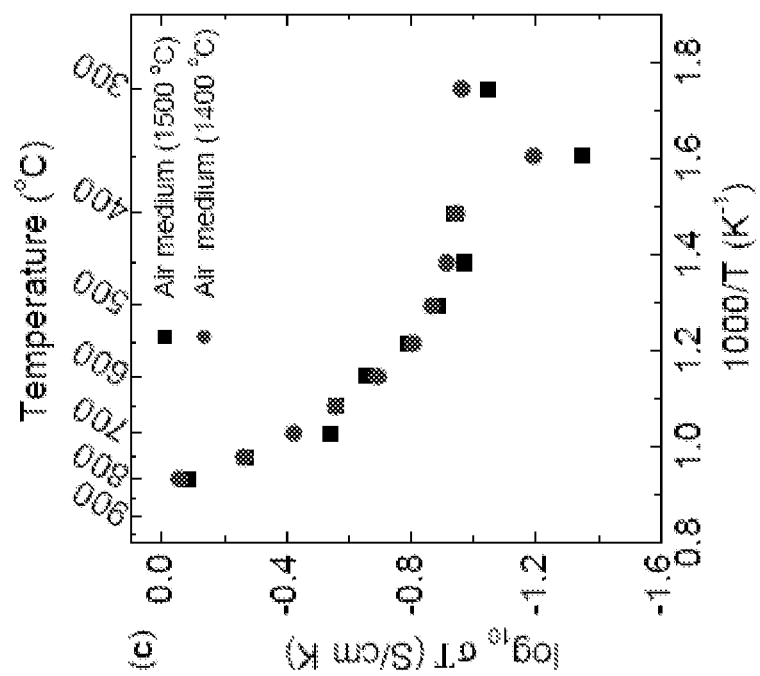
FIGS. 10c-d

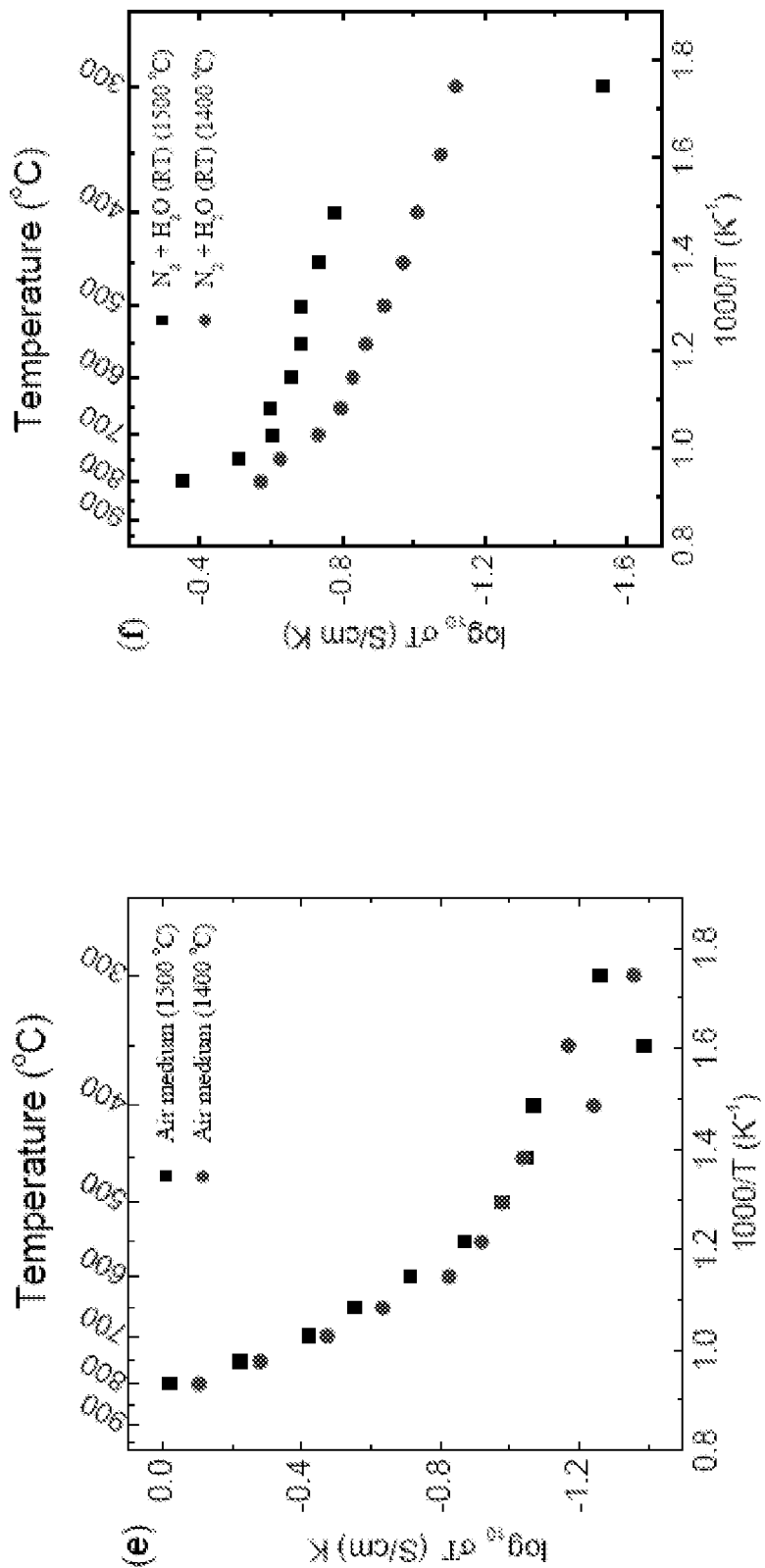
FIGS. 10e-f

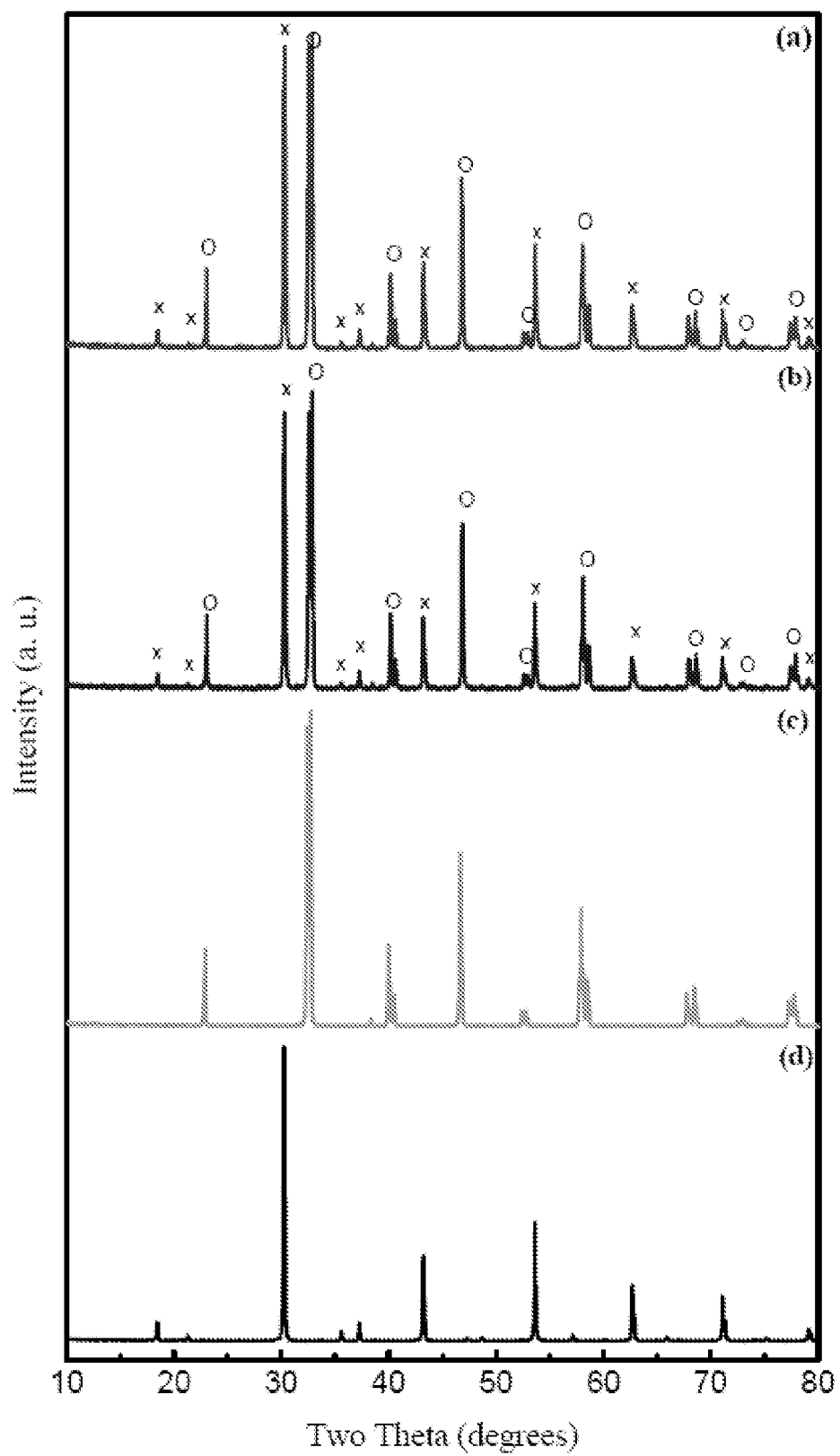
FIGS. 11a-d

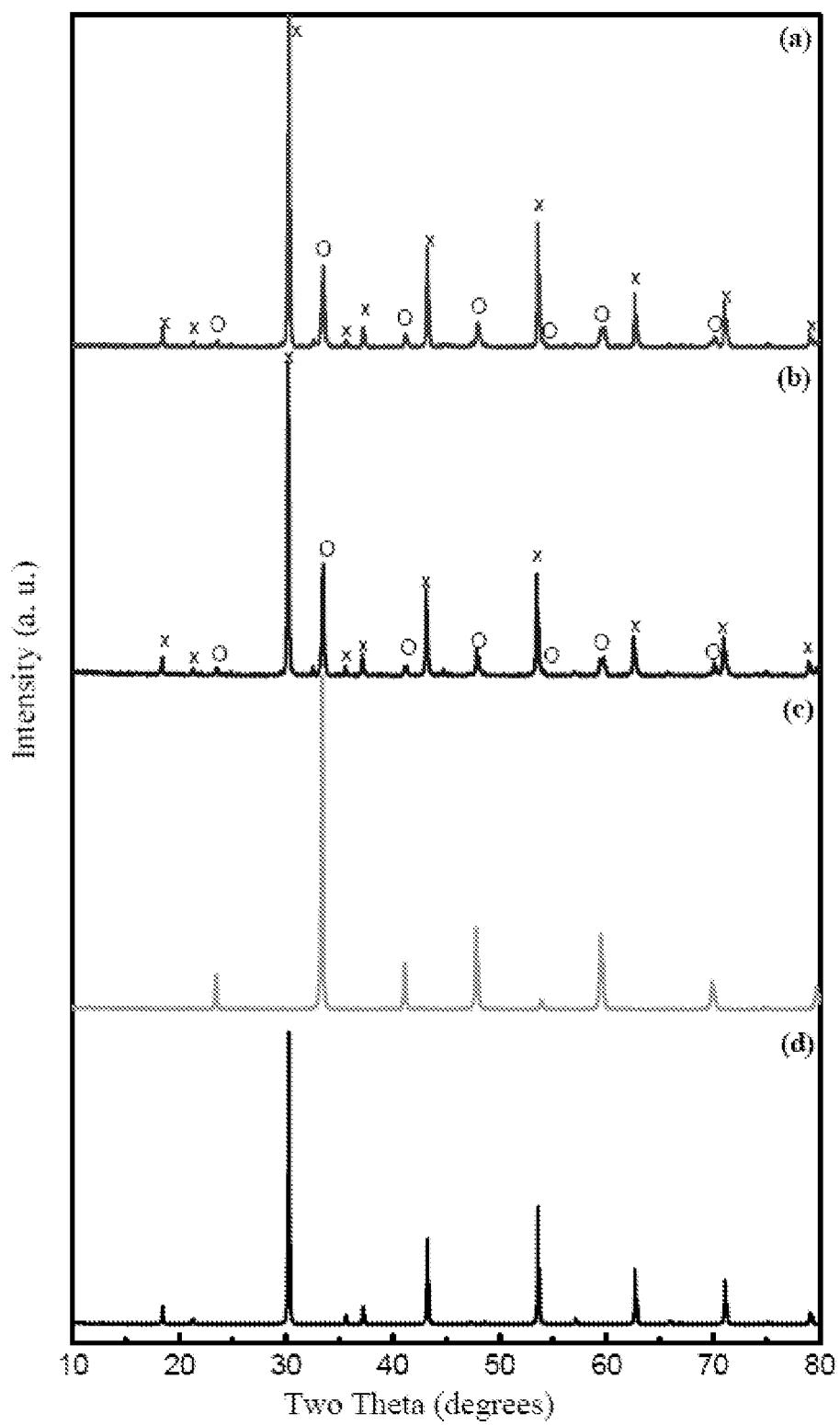
FIGS. 12a-d

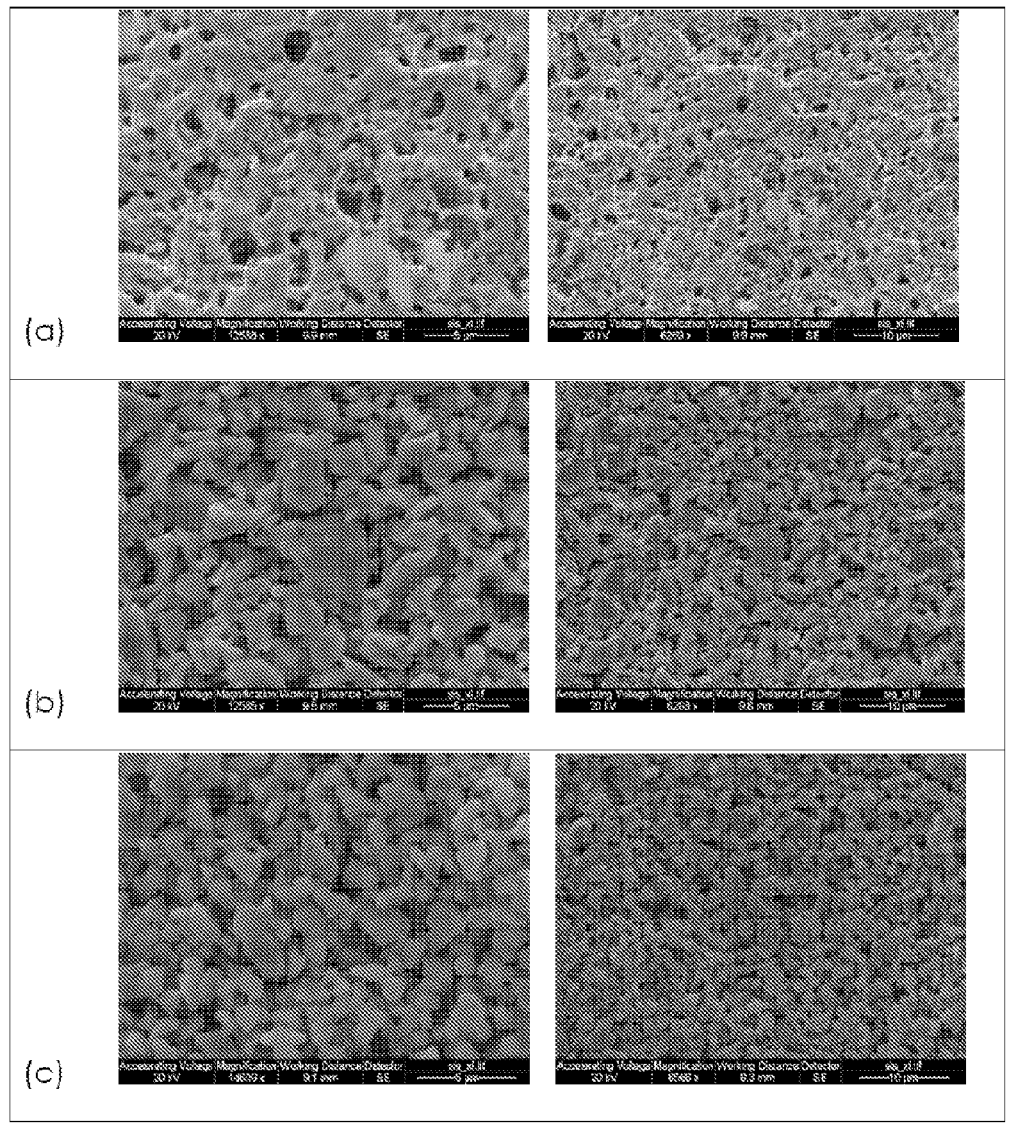
FIGS. 15a-c

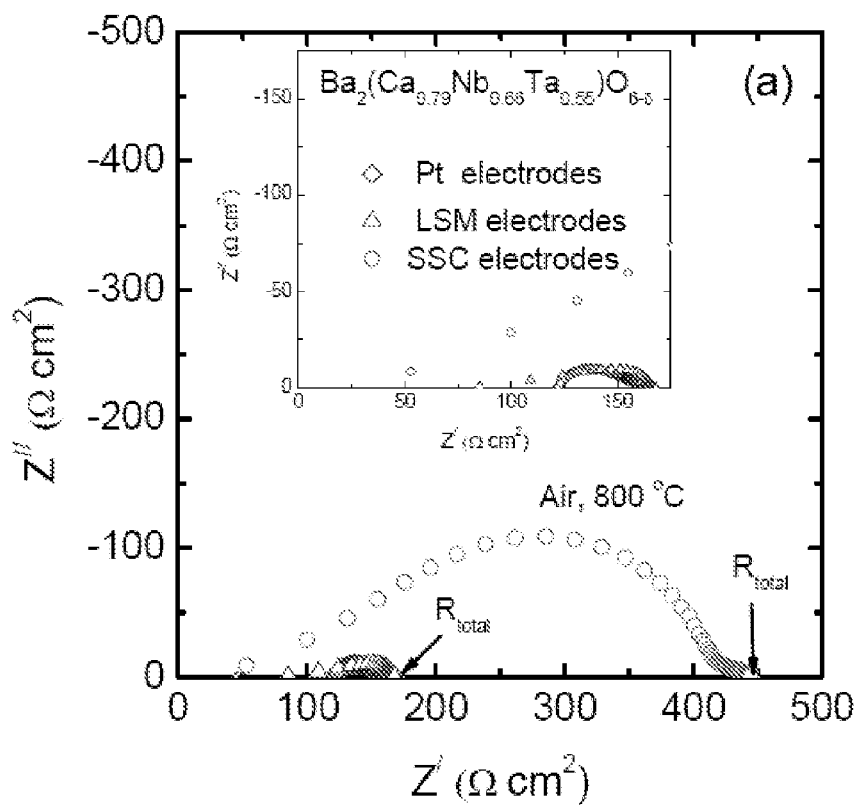
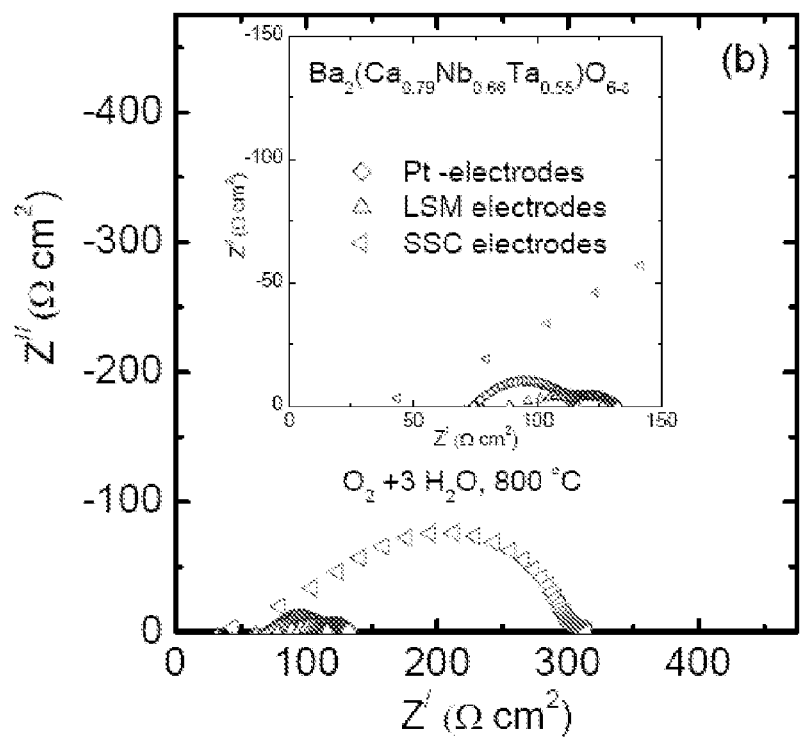
FIGS. 16a-b

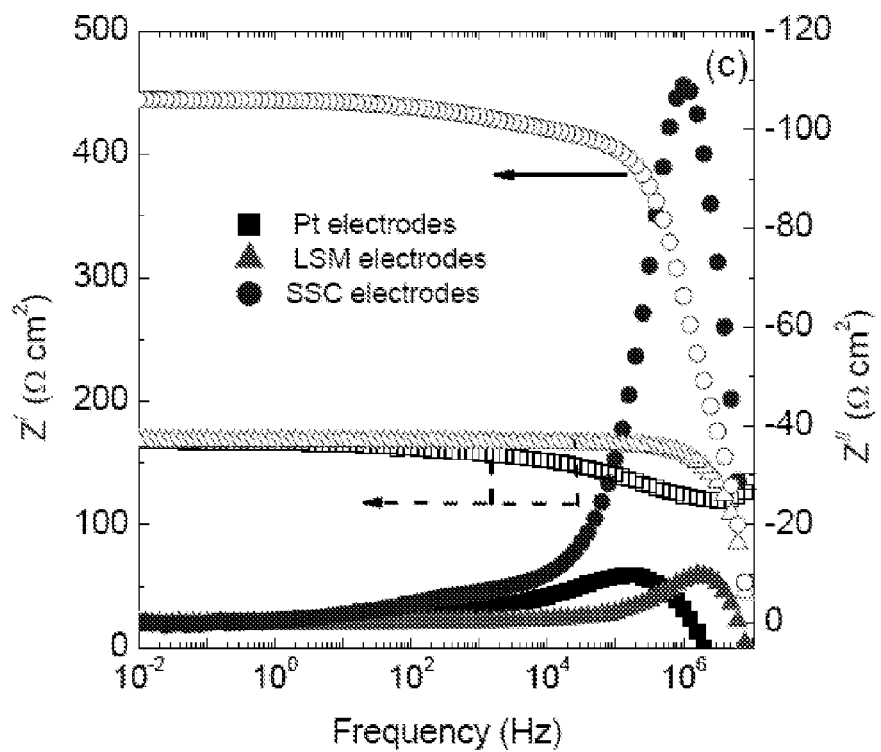
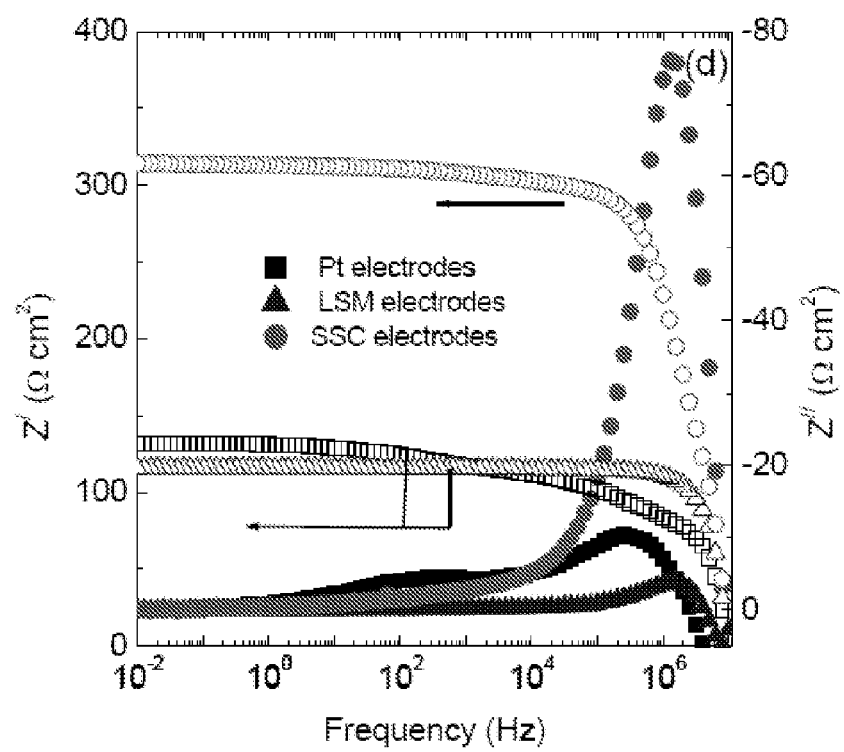
FIGS. 16c-d

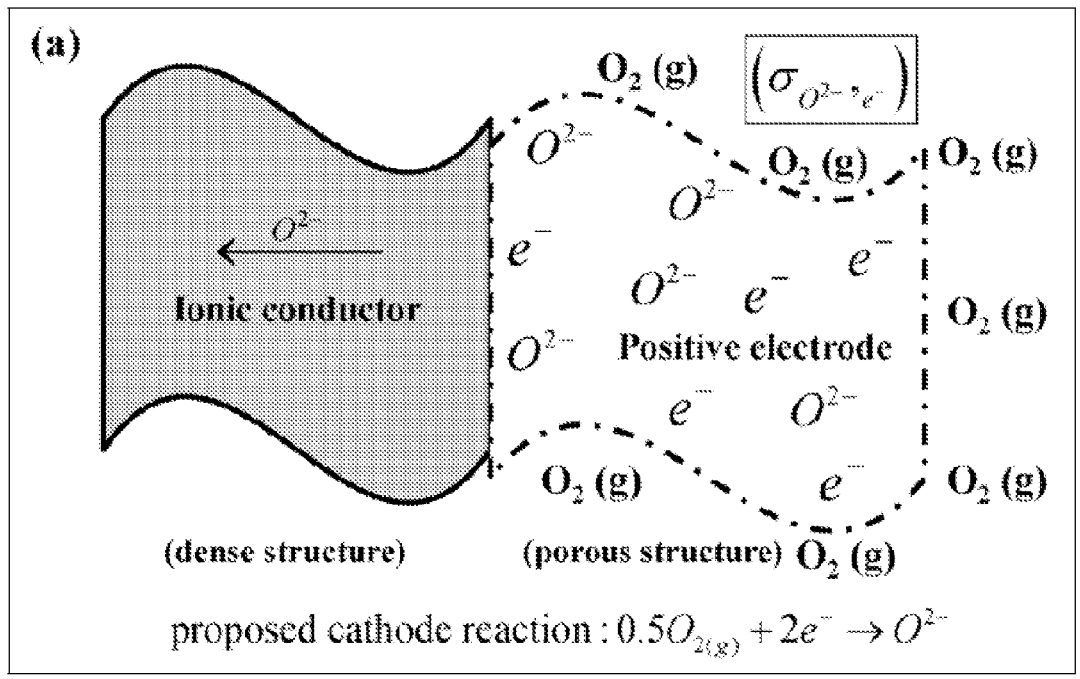
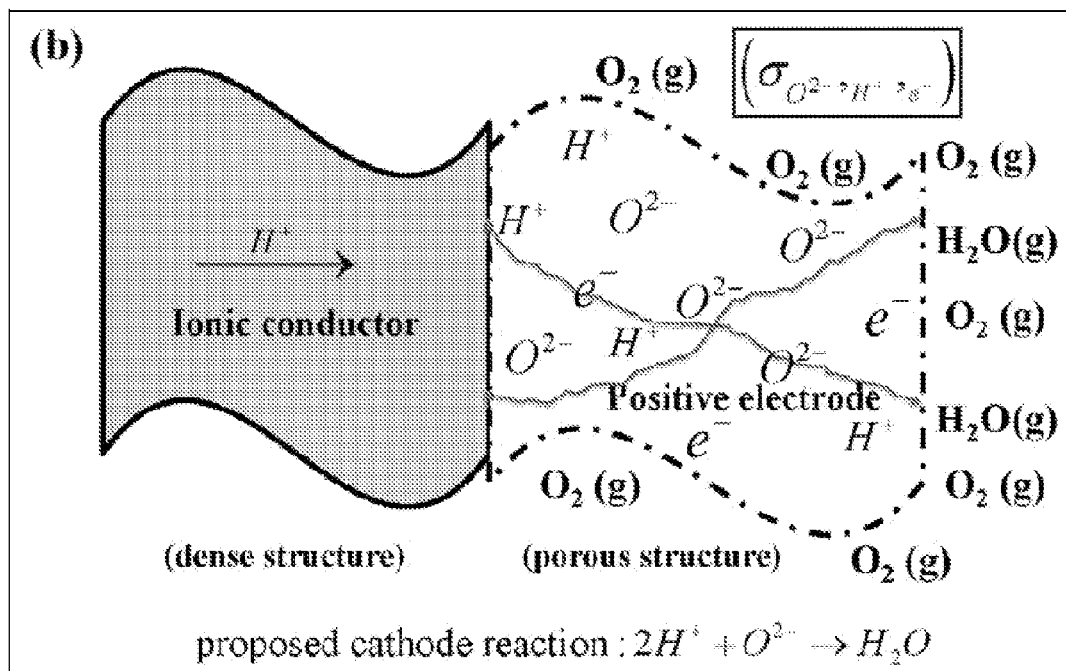
FIGS. 17a-b

PEROVSKITE-LIKE STRUCTURES

This application is a national phase application under 35 U.S.C. §371 of International Application No. PCT/IB2009/005448 filed Mar. 13, 2009, which claims the benefit of U.S. Provisional Patent Application Ser. No. 61/036,244, filed Mar. 13, 2008, the entire contents of each of which are incorporated by reference herein in their entirety.

TECHNICAL FIELD

This disclosure relates to perovskite-like structures, and more particularly to perovskite-like structures used in solid-state ionic devices.

BACKGROUND

High temperature solid-state proton conductors (HT-SSPCs) have drawn much attention since the discovery of fast proton conduction in the acceptor-doped perovskite-type ($ABO_3 \approx CaTiO_3$) structure alkaline or rare-earth containing complex metal oxides by Iwahara and others (Iwahara et al., 1981; Uchida et al., 1983; Norby, 1999; Kreuer, 1996; Iwahara, 1995; Iwahara, 1996; Bonanos, 2001). They find potential applications in various ceramic protonic devices that include gas sensors, proton exchange membrane fuel cells (PEMFCs), $H_2$ pumps, $H_2$ separation and steam electrolyser (Kreuer, 1996; Coors, 2003; Zhang et al., 2003; *Proton Conductors: Solids, Membranes and Gels—Materials and Devices,* 1992). Accordingly, a large numbers of perovskite and perovskite-related structure metal oxides have been investigated for fast proton conduction (Iwahara et al., 1990; Kreuer et al., 1994; Glöckner et al., 1999; Kruth et al., 2007). Among the various HT-SSPCs studied, hitherto, aliovalent metal ion-doped, e.g., $BaCe_{1-x}Y_xO_{3-\delta}$ (BCY) (Iwahara, 1995) and B-site non-stoichiometric double perovskite-type $Ba_3Ce_{1+x}Nb_{2-x}O_{9-\delta}$ (BCN) (Nowick and Du, 1995; Nowick et al., 1999) exhibit high proton conductivity at elevated temperatures in $H_2O$ containing atmospheres. FIG. 6a shows the crystal structure of the parent single perovskite ($ABO_3 = SrTiO_3$), and FIG. 6b shows an ordered double perovskite ($A_2BB'O_6 = Ba_2CaWO_6$).

The chemical stability of electrolyte with electrode materials and costs are major concerns in commercialization fuel cells, including solid oxide fuel cells (SOFCs) and proton membrane fuel cells (PEMFCs), and there is always a need of good chemically stable against reaction with electrolyte and cheap materials. Currently, some of the members of $La_{1-x}Sr_xMnO_3$ (LSM) has being commonly employed as the cathode material for SOFCs because of its high catalytic activity for oxygen reduction, matching thermal expansion coefficient, and chemical compatibility with yttria stabilized zirconia (YSZ) (Yamamoto et al., 1987). While LSM has shown promising performance at temperatures above 800° C., its performance decreases rapidly as the operating temperature decreases. Substitution of Sr for RE in $RECoO_3$ (RE=rare earth; Sm for SSC) was found to be better catalyst for $O_2$ reduction compared LSM, and exhibits low overpotentials for oxygen reduction reaction (ORR) (Hyang et al., 1996; Hammouche et al., 1989; Xia et al., 2002; Ishihara et al., 1998). Pt and Pt-metal alloys remain as potential electrodes (anode and cathode) for both low temperature polymer membrane and high temperature ceramic membrane based PEMFCs. However, currently very few mixed ionic and electronic conducting ceramic cathodes were investigated for high temperature PEMFCs.

SUMMARY OF THE INVENTION

In one aspect, the present disclosure provides a composition of matter comprising a compound having an empirical formula $[A(B_yC_{1-y})O_z]_x$ wherein:
  A is one or more divalent metal ions;
  B is one or more monovalent or divalent metal ions;
  C is one or more pentavalent metal ions;
  O is oxygen; and
  $x \cong 1$, $0.1 \leq y \leq 0.9$, $2.5 \leq z \leq 3$.

In some embodiments, A is calcium, strontium, barium or a combination thereof. For example, in one variation, A is barium. In another variation, A is strontium.

In some embodiments, B is sodium or calcium. In some variations thereof, B is sodium. In other variations, B is calcium.

In some embodiments, C is niobium, tantalum, antimony, or a combination thereof. In some variations thereof, C is niobium. In other variations, C is a combination of niobium and tantalum.

In some embodiments, y is from about 0.25 to about 0.30. In other variations, y is from about 0.30 to about 0.40. In some variations, thereof, y is from about 0.35 to about 0.40. In some variations thereof, y is from about 0.37 to about 0.40. In some variations, y is from about 0.375 to about 0.395.

In some embodiments, the compound has the empirical formula $Sr(Na_{0.25}Nb_{0.75})O_3$. In other embodiments, the compound has the empirical formula $Ba(Na_{0.25}Nb_{0.75})O_3$.

In some embodiments, the compound has the empirical formula $[Ba(Ca_y(Nb,Ta)_{1-y})O_z]_2$. In some variations thereof, the compound has the empirical formula $Ba_2(Ca_{0.75}Nb_{0.59}Ta_{0.66})O_{6-\delta}$, wherein $\delta$ is defined as $0<\delta \leq 1$. For example, $\delta$ can be about 0.125. In other variations thereof, the compound has the empirical formula $Ba_2(Ca_{0.75}Nb_{0.66}Ta_{0.59})O_{6-\delta}$, wherein $\delta$ is defined as $0<\delta \leq 1$. For example, $\delta$ can be about 0.125. In still other variations thereof, the compound has the empirical formula $Ba_2(Ca_{0.79}Nb_{0.66}Ta_{0.55})O_{6-\delta}$, wherein $\delta$ is defined as $0<\delta \leq 1$. For example, $\delta$ can be about 0.185.

In some embodiments, x is greater than 1. In some variations, x is 2.

In some embodiments the composition comprises material having a crystalline, semi-crystalline, or amorphous character.

In some embodiments, the compound has an empirical chemical formula $A_x(B_yNb_{1-y})_xO_{3x}$, wherein:

$$x \geq 1; 0.1 \leq y \leq 0.9$$

A comprises one or more divalent metal ions;
  B comprises one or more monovalent metal ions; and
  O is oxygen.

In some embodiments of any of the compounds described above, the compound is electrically neutral.

In another aspect, there is provided a device comprising any of the compositions described above. In some embodiments, the device is configured as a gas sensor. In some embodiments, the device is configured as a galvanic cell. In some embodiments, the device is configured to capture carbon dioxide. In some embodiments, the device is configured as a gas pump. In some variations thereof, the gas pump is configured to pump oxygen or hydrogen.

In another aspect, there is provided a proton or mixed proton-electron conductor comprising any of the above compositions. In some embodiments, the proton or mixed proton-electron conductor further comprises a dopant or solvent moiety. In some embodiments, the empirical chemical formula is $Sr(Na_{0.25}Nb_{0.75})O_3$ or $Ba(Na_{0.25}Nb_{0.75})O_3$.

In another aspect, there is provided a fuel cell, comprising: a proton exchange membrane configured to transport protons to a cathode side of said fuel cell, and an electrically-conductive path connecting an anode to said cathode along which electrons preferentially flow, wherein the proton exchange membrane comprises any of the above compositions.

In another aspect there is provided a method of making any of the above compositions of matter, comprising reacting together: a first compound comprising a divalent metal ion, a second compound comprising one or more monovalent metal ions, and a third compound comprising one or more pentavalent metal ions, wherein the method results in any of the above compositions of matter. In some embodiments, the reaction is performed at elevated temperatures. For example, the method can be performed from about 1,000° C. to about 1,500° C. In another non-limiting example, the reaction can be performed from about 1,000° C. to about 1,250° C. In some embodiments, the reaction is performed as a mixed oxide solid state reaction.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

Any embodiment discussed herein with respect to one aspect of the invention applies to other aspects of the invention as well, unless specifically noted. Other objects, features and advantages of the present invention will become apparent from the following detailed description and any accompanying drawings. It should be understood, however, that the detailed description and any specific examples or drawings provided, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 6a-b show idealized crystal structure of (a) simple $ABO_3$ ($\equiv SrTiO_3$) and (b) double B-site ordered $A_2BB'O_6$ ($\equiv Ba_2CaWO_6$) perovskites. The closed circles represent the A-site cations in the perovskite lattice.

FIGS. 7a-c show XRD patterns of double perovskite-type (a) $Ba_2(Ca_{0.79}Nb_{0.66}Ta_{0.55})O_{6-\delta}$, (b) $Ba_2(Ca_{0.75}Nb_{0.66}Ta_{0.59})O_{6-\delta}$, and (c) $Ba_2(Ca_{0.75}Nb_{0.59}Ta_{0.66})O_{6-\delta}$. These materials were prepared in the air at 1,400° C.

FIGS. 8a-f show SEM images of (a) $Ba_2(Ca_{0.79}Nb_{0.66}Ta_{0.55})O_{6-\delta}$, (b) $Ba_2(Ca_{0.75}Nb_{0.66}Ta_{0.59})O_{6-\delta}$, (c) $Ba_2(Ca_{0.75}Nb_{0.59}Ta_{0.66})O_{6-\delta}$ prepared at 1,400° C., and (d)-(f) show the images of the corresponding samples prepared at 1,500° C.

FIGS. 9a-d show AC resistivity plots at 550° C. ($10^{-2}$ Hz-$10^7$ Hz) (a) in air and (b) in wet $N_2$ of $Ba_2(Ca_{0.75}Nb_{0.66}Ta_{0.59})O_{6-\delta}$ (1,400° C.-€ 1,500° C.-■), $Ba_2(Ca_{0.75}Nb_{0.59}Ta_{0.66})O_{6-\delta}$ (1,400° C.-○; 1,500° C.-●) and $Ba_2(Ca_{0.79}Nb_{0.66}Ta_{0.55})O_{6-\delta}$ (1,400° C.-Δ; 1,500° C.-▲). The corresponding real part of resistivity as a function frequency is shown in (c) and (d). The insets show the expanded view at the high frequency part.

FIGS. 10a-f show electrical conductivity at 1 MHz in air and wet $N_2$ for $Ba_2(Ca_{0.79}Nb_{0.66}Ta_{0.55})O_{6-\delta}$ (a—air; b—wet medium), $Ba_2(Ca_{0.75}Nb_{0.66}Ta_{0.59})O_{6-\delta}$ (c—air; d—wet medium) and $Ba_2(Ca_{0.75}Nb_{0.59}Ta_{0.66})O_{6-\delta}$ (e—air; f—wet medium).

FIGS. 11a-d show powder X-ray diffraction patterns showing the chemical reactivity of electrolyte $Ba_2(Ca_{0.79}Nb_{0.66}Ta_{0.55})O_{6-\delta}$ with electrode $La_{0.8}Sr_{0.2}MnO_3$ (LSM) (a) after sintering the reaction mixture (1:1 weight ratio) of electrolyte and electrode at 1,000° C. and (b) 800° C. in air for 12 h, (c) as-prepared LSM in air at 1,200° C., and (d) as-prepared $Ba_2(Ca_{0.79}Nb_{0.66}Ta_{0.55})O_{6-\delta}$ in air at 1,500° C. The peaks due to electrolyte and electrodes in the reaction mixture are marked as 'x' and 'o', respectively. The diffraction study reveals that the investigated electrolyte is chemically stable against reaction with LSM up to 1,000° C.

FIGS. 12a-d show powder X-ray diffraction patterns showing the chemical reactivity of electrolyte $Ba_2(Ca_{0.79}Nb_{0.66}Ta_{0.55})O_{6-\delta}$ with electrode $Sm_{0.5}Sr_{0.5}CoO_3$ (SSC) (a) after sintering the reaction mixture of electrolyte and electrode at 1,000° C. and (b) 800° C. in air for 12 h, (c) as-prepared SSC in air at 1,200° C., and (d) as-prepared $Ba_2(Ca_{0.79}Nb_{0.66}Ta_{0.55})O_{6-\delta}$ in air at 1,500° C. The peaks due to electrolyte and electrodes in the reaction mixture are marked as 'x' and 'o', respectively. The diffraction study reveals that the investigated electrolyte is chemically stable against reaction with SSC up to 1,000° C.

FIGS. 15a-c show typical SEM images showing (a) Pt, (b) LSM and (c) SSC coating on $Ba_2(Ca_{0.79}Nb_{0.66}Ta_{0.55})O_{6-\delta}$ electrolyte prepared at 1,500° C. These images were obtained after the electrical measurements in air and wet $N_2$.

FIGS. 16a-d show area normalized AC impedance plots ($10^{-2}$ Hz-$10^7$ Hz) of Pt, LSM and SSC electrodes in (a) air and (b) humidified $O_2$ measured using electrolyte $Ba_2(Ca_{0.79}Nb_{0.66}Ta_{0.55})O_{6-\delta}$ (Ta-doped BCN) prepared at 1,500° C. Plots (c) and (d) show the corresponding area normalized impedance data at 800° C. as a function of frequency in air and humidify, respectively. Comparable impedance plots were obtained for a 1,400° C. prepared sample.

FIGS. 17a-b show schematic representations showing the idealized solid electrolyte/cathode interface of (a) SOFCs and (b) PEMFCs. The ionic and electronic conductivity of cathode materials pay important role in both type of fuel cells.

DESCRIPTION OF ILLUSTRATIVE EMBODIMENTS

Figure 1:
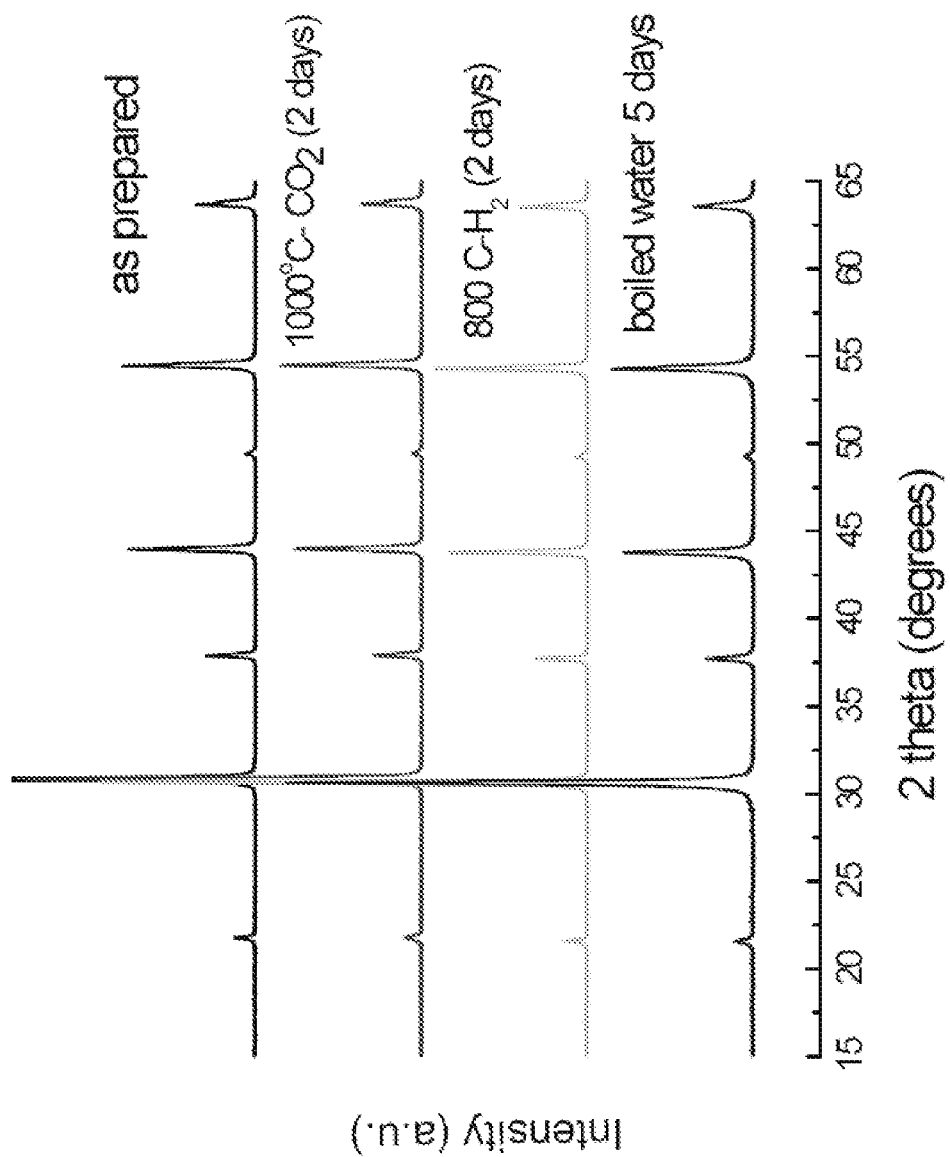
FIG. 1 is a series of powder X-ray diffraction patterns of a perovskite-like structure before and after exposure to $H_2$, $CO_2$, and boiling water.

I. Solid Oxide Fuel Cells and Proton-Exchange Membrane Fuel Cells

In general, fuel cells generate electrochemical energy by reacting a fuel supply on an anode side with an oxidant on a cathode side in the presence of an electrolyte. There may also be catalysts for ionizing a fuel included in the cell. In general, there are five types of fuel cells based on nature of the electrolyte employed. For example, in a hydrogen/oxygen ceramic proton exchange membrane fuel cell, hydrogen at the anode dissociates into a proton and an electron aided by a catalyst, such as platinum. The protons generated can migrate through an electrically-insulating and ionically conducting membrane to the cathode, but the electrons travel through an external circuit, thereby creating electrical current. When electrons reach the cathode, they can combine with protons and supplied oxygen to form water, the "waste" product of the cell. In the case of solid oxide fuel cells, the oxide ion generated at the cathode (positive electrode) side can migrate through the electrolyte to the anode (negative electrode) side and interact with fuel.

Both solid-oxide fuel cell (SOFC) and proton-exchange membrane fuel cell (PEMFC) architectures are used in electrochemical energy conversion systems. SOFC's are generally characterized by being composed of all solid-state materials, usually ceramics, and operate at higher temperature (750-1,000° C.) than other fuel cell designs. In some cases, SOFC operation can be problematic, owing to the high temperatures required for reasonable oxide ion conductivity, e.g., in $Y_2O_3$-stabilized $ZrO_2$ (YSZ) electrolytes. The high temperature requirement leads to several materials science problems, including the diffusion of Sr and La between the cathode (Sr-doped $LaMnO_3$) and electrolyte (YSZ), which leads to the formation of resistive reaction products. For example, perovskite-like $SrZrO_3$ and pyrochlore $La_2Zr_2O_7$ can block oxide ion migration across the cathode-electrolyte interface. Furthermore, mechanical stresses from thermal expansion can destroy electrolytes and expensive bi-polar separators, and weaken electrode contact. SOFC's may also require chemically inert sealing materials that guard against reaction with the other components of the cell.

The low temperature PEMFC's that utilize proton conducting polymer electrolytes (e.g., Nafion®) usually require pure hydrogen fuels, usually obtained by reforming hydrocarbon fuels such as natural gas. Since these hydrocarbon fuels typically contain gases such as carbon monoxide and sulfur that can be poisonous to the catalyst system, the process may require an additional fuel purification unit. PEMFC's may be expensive due to the amount of Pt required for fast electrode kinetics.

II. Solid-State Proton Conductors

Solid-state proton conductors (SSPC's) can be used at lower operating temperatures, and the catalyst poisoning problems associated with low-temperature PEMFC's may be significantly reduced. SSPC's can be broadly classified into two types based upon temperature of operation: (i) low-temperature (LT) (below 100° C.) and (ii) high-temperature (HT) conductors (above 500° C.). The ionic conductivity of the former type can mainly depend on the water content of the compound, while in the latter case, it usually depends predominantly on the concentration of proton dissolved in oxygen lattice sites, charge mobility, and the hydrogen partial pressure ($pH_2$) of the surrounding atmosphere. One type of HT proton conductor is the perovskite-like structure Y-doped $BaCeO_3$ (BCY). This material is not chemically stable for extended periods in $CO_2$ atmospheres at elevated temperatures, nor in humid environments near operating conditions. Also, BCY and related materials can have poor mechanical stability and be highly brittle. Therefore, Y-doped $BaCeO_3$ may not the best solid electrolyte candidate for PEMFC's.

III. Perovskites

Perovskite, $CaTiO_3$, is a mineral that adopts the orthorhombic crystal structure and also generally refers to a class of crystals with the same atomic configuration. Pyroxene enstatite ($MgSiO_3$) is an example of a perovskite polymorph found in the Earth's crust. The basic perovskite formula $ABO_3$, where A=mono, di, or trivalent cations, and B=tri, tetra or pentavalent cations that are cations of differing size. The perovskite structure can find utility in technological applications such as ferroelectrics, solid electrolytes (e.g., membranes for ionic devices), ionic conductors, electrodes, catalysts, and superconductors. The superconductor $YBa_2Cu_3O_7$ adopts an oxygen-deficient perovskite-related structure.

Perovskites have the general structure $ABX_3$, where X is usually $O^{2-}$ or a combination of oxide ion and other anions that including fluorine and/or nitrogen. Generally, a perovskite, e.g., $SrTiO_3$, exhibits a primitive cubic structure: cubic close packing of anions X, with one quarter of the anions replaced by A cations in an ordered manner, and the B cations distributed at the octahedral interstitial site. The A cations occupy the center of a cube at the 12-fold coordination site. Depending on the A and B-site cations, cubic, tetragonal, orthorhombic, hexagonal, and monoclinic structure perovskites can be formed. The unit cells of perovskites are generally non-centrosymmetric and distorted, leading to a net electronic polarization. The polarization of many perovskite cells together can give rise to useful and interesting technologically relevant physical and chemical properties in some species, such as ferromagnetism, piezoelectricity, and superconductivity.

Oxide vacancies in the perovskite structure are known to interact with water vapors, usually in the presence of metal catalysts, at elevated temperatures to form mobile protons. Between BCY and BCN, $Ba_3Ca_{1.18}Nb_{1.82}O_{9-\delta}$ (BCN18) shows about two orders of magnitude higher proton conductivity than that of BCY at low temperatures (below 400° C.)

(Kreuer, 2003). The most of the Ba-containing former-type HTSSPCs, except Y+Zr-doped BCY, form $BaCO_3$ in high concentration of $CO_2$ (a common by product in hydrocarbon fueled fuel cells) elevated temperatures, and $Ba(OH)_2$ in boiling water and also in water vapor (a coming by-product at the cathode side and also formed during the reforming of hydrocarbon), and hence their applications in hydrocarbon based fuel cells are limited (Tanner & Virkar, 1996; Bhide & Virkar, 1999a; Bhide & Virkar, 1999b; Azad & Irvine, 2007). While the later BCN-based proton conductors were found to be robust against chemical reaction in $CO_2$ at elevated temperatures, as well as stable in boiling water (Bhella & Thangadurai, 2009).

Recent studies have shown that the preparation condition, especially sintering temperature can affect the mechanical/chemical stability, microstructure, density, and obviously affect the electrical conductivity (Carrillo-Cabrera & Wagner, 1988; Badwal, 1995; Tian & Chan, 2000; Yoshida et al., 2002; Zhang et al., 2005; Sha et al., 2007; Li et al., *J. Power Sources*, 183:498 (2008); Zhong, 2007; Iguchi et al., 2006). For example, $BaCe_{0.9-x}Zr_xY_{0.1}O_{2.95}$ (BZY) prepared at 1,650° C. showed much improved density and stability against chemical reaction in $CO_2$ than that of low-temperature prepared samples (Zhong, 2007). The bulk and grain-boundary conductivities of BZY sintered for a long-period of time and high temperature were significantly lower than the samples sintered for shorter period, which has been attributed to increase in the high density. BCN18 prepared at high temperatures (1,600° C.) showed lower proton conductivity compared to that of the low temperature (1,400° C.) samples (Valkenberg et al., 1997).

Figure 13:
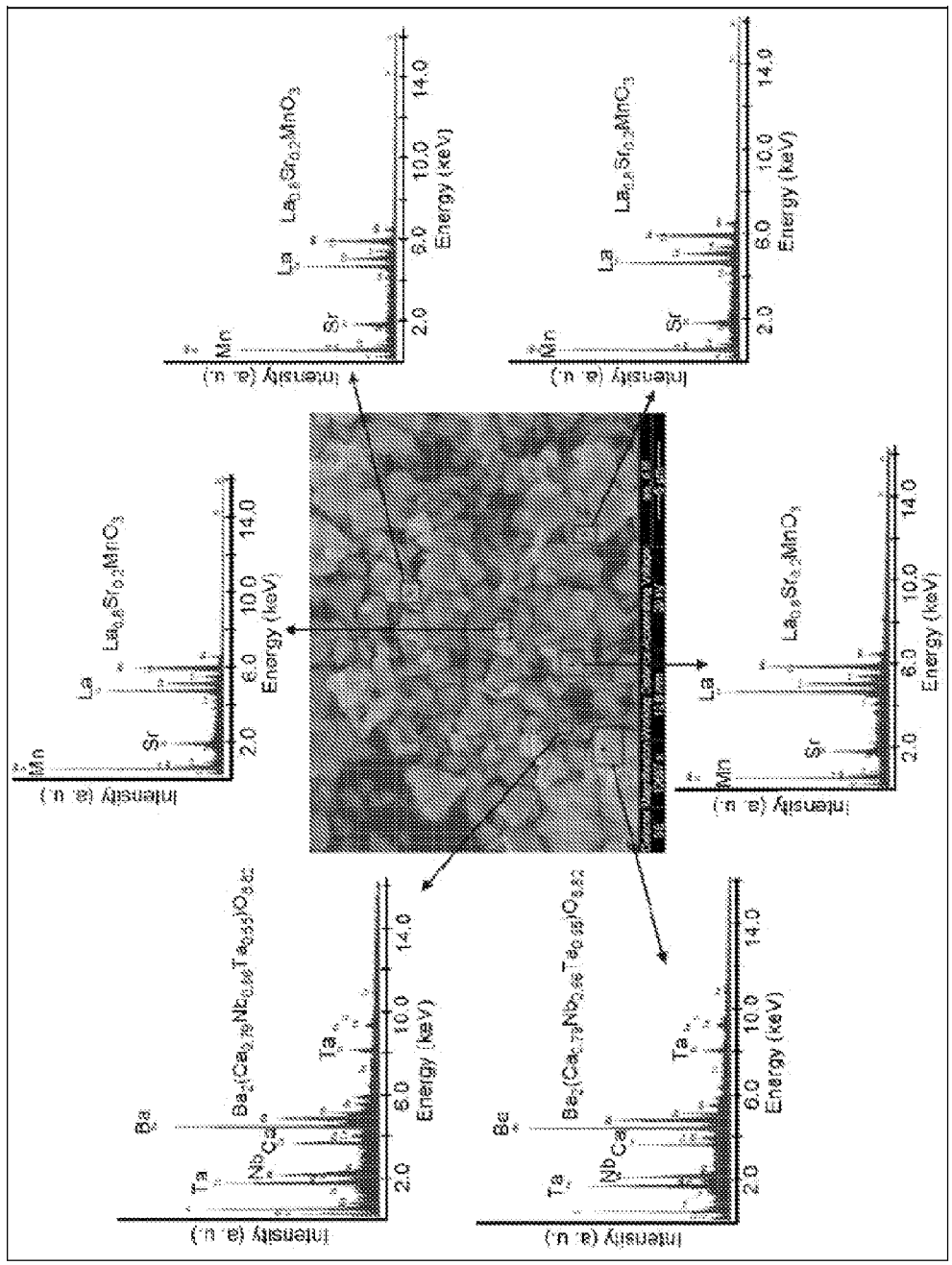
FIG. 13 shows a typical SEM image and EDAX results for the reactivity of electrolyte material $Ba_2(Ca_{0.79}Nb_{0.66}Ta_{0.55})O_{6-\delta}$ (prepared at 1,500° C.) with electrode material $La_{0.8}Sr_{0.2}MnO_3$ after sintering the reaction mixture at 1,000° C. in air for 12 h.
Figure 14:
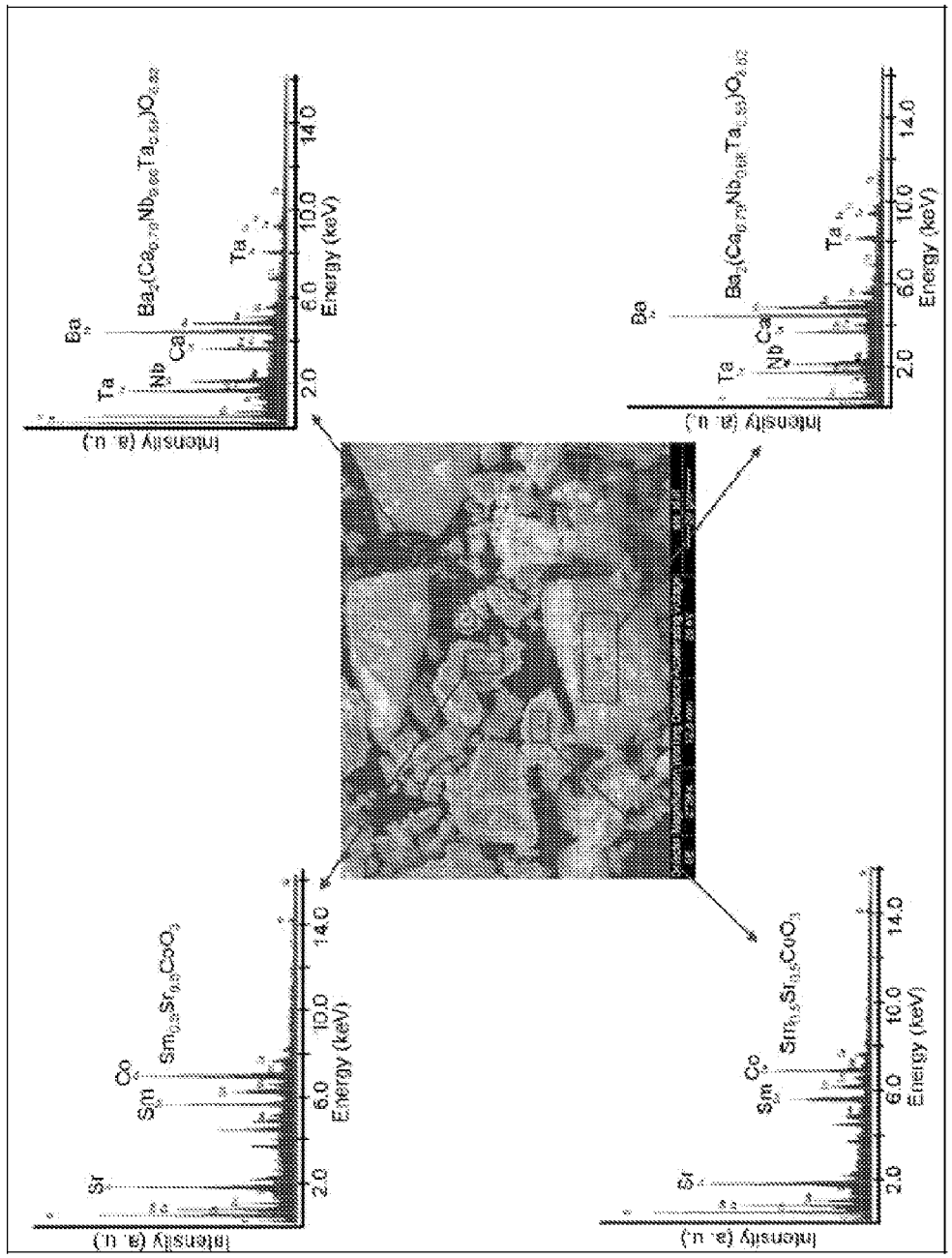
FIG. 14 shows a typical SEM image and EDAX results for the reactivity of electrolyte material $Ba_2(Ca_{0.79}Nb_{0.66}Ta_{0.55})O_{6-\delta}$ (sintered at 1,500° C.) with electrode material $Sm_{0.5}Sr_{0.5}CoO_3$ after sintering the mixture at 1,000° C. in air for 12 h.
Figure 18A:
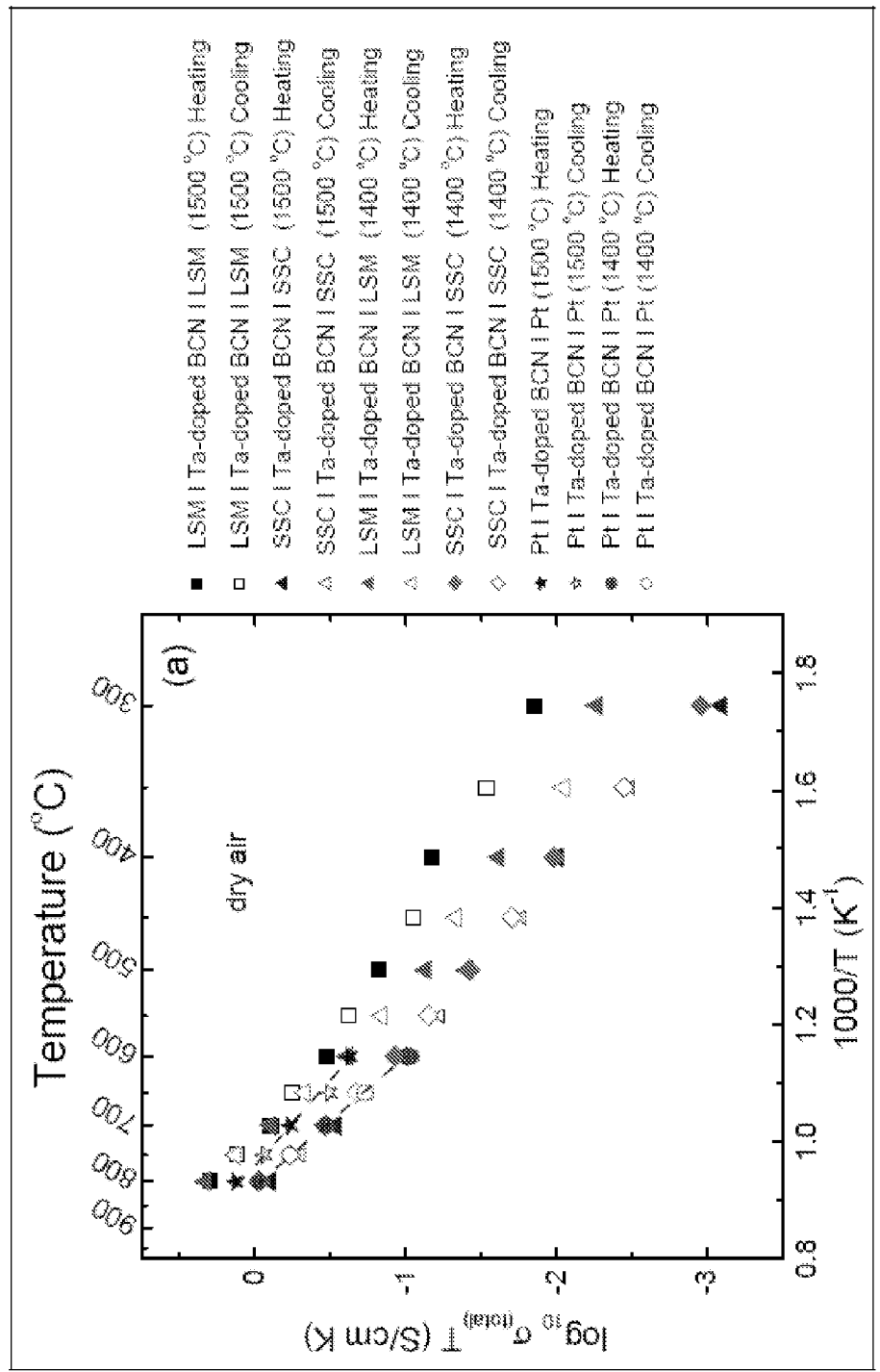
FIGS. 18a-b show the total electrical conductivity (bulk+grain-boundary+electrode) of $Ba_2(Ca_{0.79}Nb_{0.66}Ta_{0.55})O_{6-\delta}$ (Ta-doped BCN prepared at 1,400 and 1,500° C.) in (a) air and (b) 3% $H_2O+N_2$ measured using Pt, LSM and SSC electrodes.
Figure 18B:
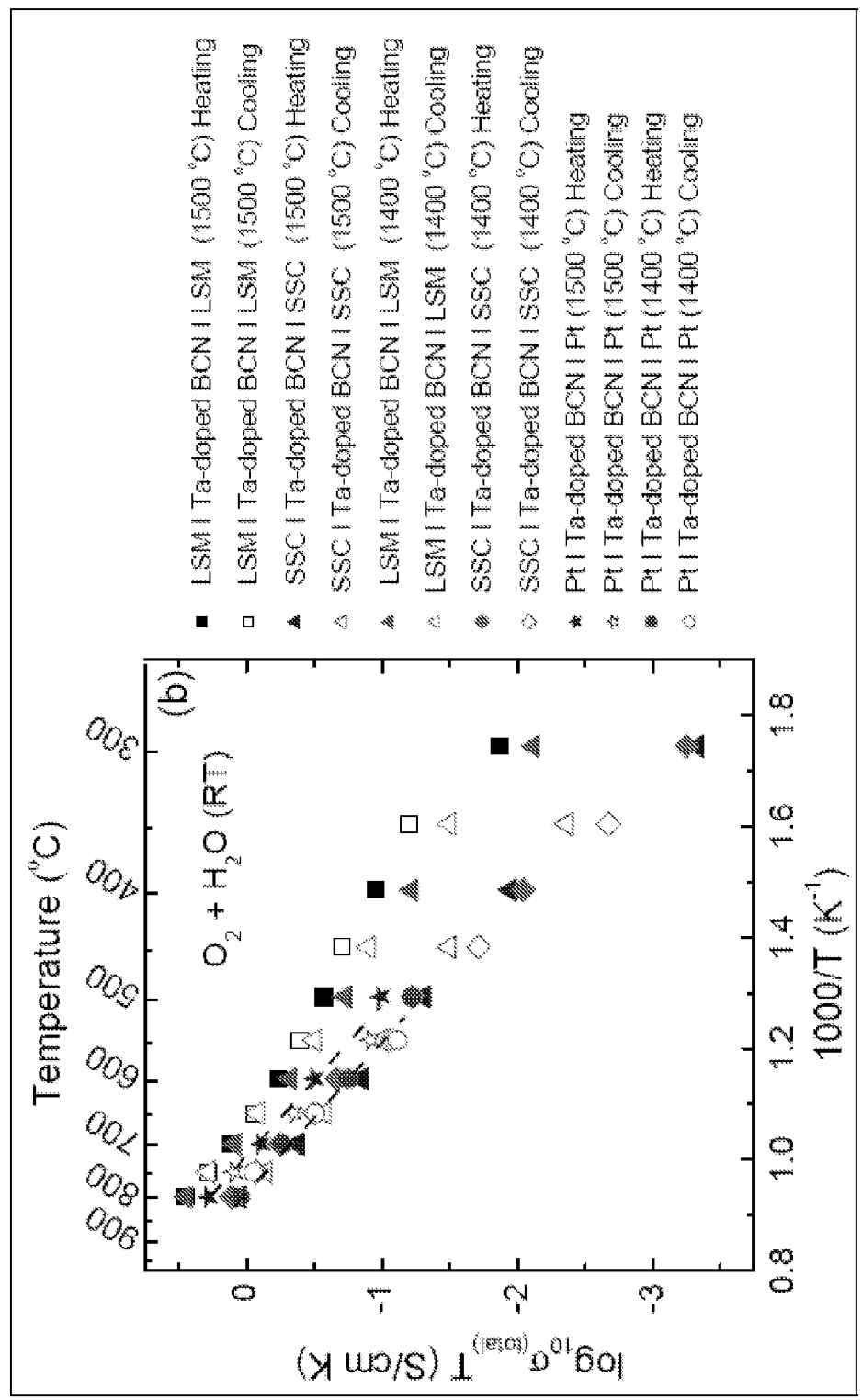
Figure 19:
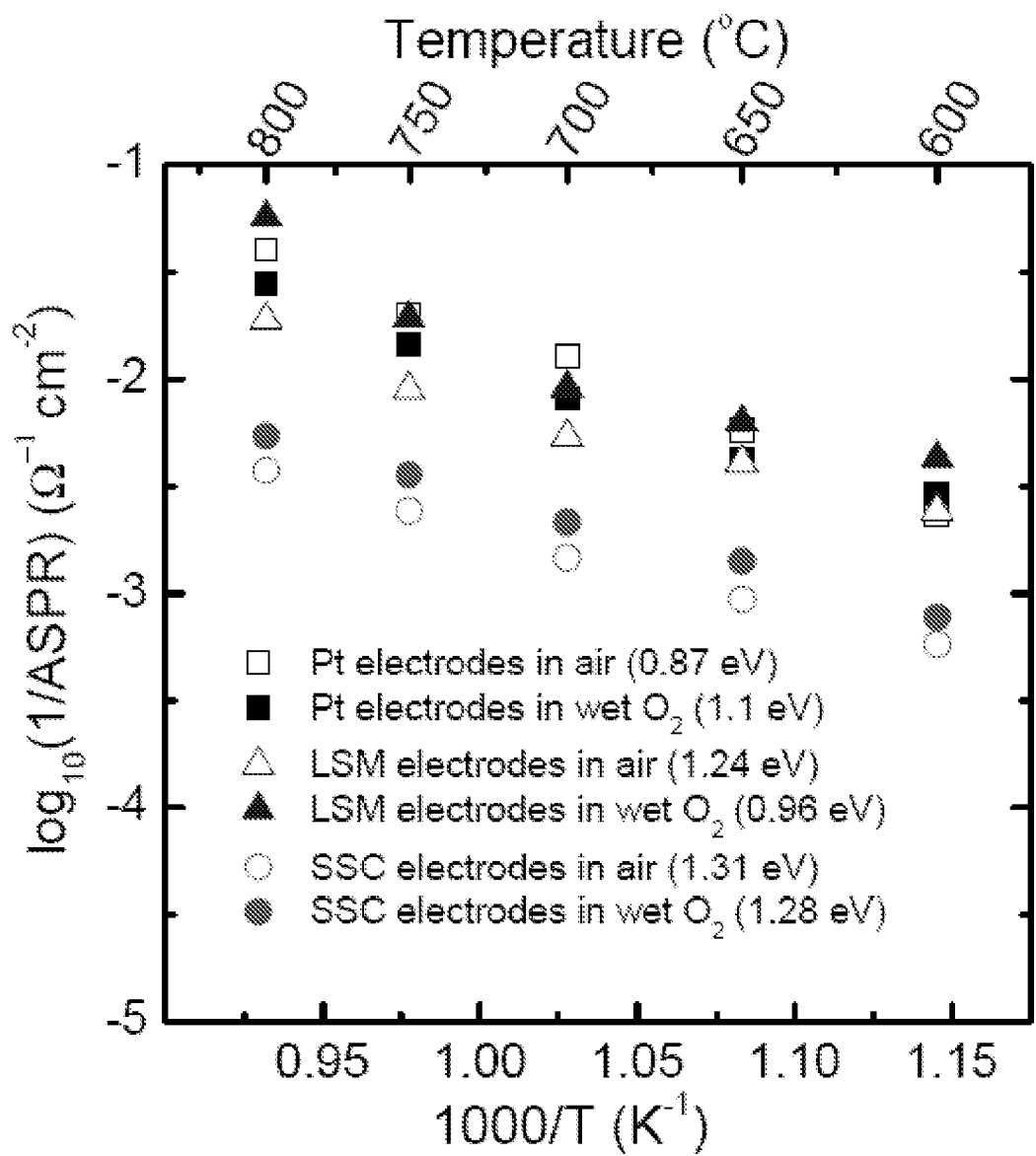
FIG. 19 shows variation of approximate ASPR for Pt, LSM, and SSC electrodes determined on proton conducting $Ba_2(Ca_{0.79}Nb_{0.66}Ta_{0.55})O_{6-\delta}$ electrolyte as a function of temperature in air and wet $O_2$.

IV. Synthesis and Characterization of Novel Perovskite and Perovskite-Like Materials In one general aspect, a perovskite-like compound having the empirical formula $[A(B_yC_{1-y})O_z]_x$ is provided. For example, in a specific embodiment, there is disclosed herein a long-term chemically stable (in 100% $CO_2$, and boiling water) proton conducting Ta-doped $Ba_2(CaNb)_2O_6$, as has been described in Bhella, and Thangadurai, (2009), which is incorporated herein by reference in its entirety. For example, in one variation of the present disclosure, $Ba_2(Ca_{0.79}Nb_{0.66}Ta_{0.55})O_{6-\delta}$ showed about one and half orders of magnitude lower proton conductivity than that of $CO_2$ unstable $Y_2O_3$-doped $BaCeO_3$ (BCY) and less than half order of magnitude higher proton conductivity of $5 \times 10^{-4}$ S/cm at 400° C. in wet (3% $H_2O$) $N_2$ than that of another perovskite-related structure HT-SSPCS (Bhella & Thangadurai, 2009 (compare #10 and #1 of FIG. 13 of this reference, which is incorporated herein by reference).

In one embodiment, the variable A is one or more types of divalent metal ions. Examples of divalent metal ions include ions of any metals in the periodic table; exemplary divalent metal ions include the Group II alkali earth metals, for example, calcium, strontium and barium. B is one or more monovalent and/or divalent metal ions. Examples of monovalent metal ion include, for example, lithium and sodium ions. Examples of divalent metal ions include, for example, such as calcium. C can include one or more tetravalent or pentavalent metal ions, such as ions of titanium, zirconium, niobium, tantalum, and antimony. C can also include combinations of metal ions selected from the periodic table, such that the net charge of C, when complexed with other metals, is +5. For example, in some embodiments, C is one or more pentavalent metal ions.

A perovskite-like structure may, in certain embodiments, include a compound having an empirical chemical formula $[A(B_yC_{1-y})O_z]_x$, wherein A is one or more divalent metal ions, B is one or more monovalent metal ions, C is one or more pentavalent metal ions, and O is oxygen; $x \geq 1$, $0.1 \leq y \leq 0.9$, $2.5 \leq z \leq 3$. Further, the net charge of A is +2, and the net charge of $(B_yC_{1-y})$ is +4, for z=3. In selected embodiments, A in the formula $[A(B_yC_{1-y})O_z]_x$ is calcium, strontium, barium or a combination thereof. In some embodiments, B in the preceding empirical chemical formula is niobium, tantalum, antimony, or a combination thereof. The variable y is a numerical range that can span from about 0.25 to about 0.30. In some embodiments, a perovskite-like structure is $Sr(Na_{0.25}Nb_{0.75})O_3$. In some embodiments, a perovskite-like structure is $Ba(Na_{0.25}Nb_{0.75})O_3$. The perovskite-like and related structures disclosed herein can be crystalline, semi-crystalline, or amorphous in character.

In certain other embodiments, a perovskite-like structure may include a compound having an empirical formula $A_x(B_yNb_{1-y})_xO_{3x}$. In this embodiment, $x \geq 1$, $0.1 \leq y \leq 0.9$, A is one or more divalent metal ions, B is one or more monovalent metal ions, O is oxygen, the net charge of A is +2, and the net charge of B is +1.

A perovskite-related structure is the AO system ((A=Ca, Sr, Ba, or combinations thereof)-$M_2O_5$ (M=Nb, Ta, Sb)—$B_2O$ (B=Li, Na)) with a nominal chemical composition of $A_n(B_yNb_{1-y})O_z$, where n, y, and z represent numerical ranges. This system has been found to provide excellent chemical stability in $CO_2$ and $H_2$ atmospheres up to 1,000° C., and also in boiling water, for periods of up to five days (FIG. 1). In one aspect, perovskite-like structures of the form $A(B_yNb_{1-y})O_3$ may be used as proton or proton/electron conductors in fuel cells.

In general, a perovskite structure can be represented $[A(B_yC_{1-y})O_3]_x$, where x and y are numerical ranges. For example, if x=2, a double-perovskite structure can have the form $A_2(B_yC_{1-y})_2O_6$; similarly a triple-perovskite structure (x=3) can have the form $A_3(B_yC_{1-y})_3O_9$.

In general, other perovskite-related structures, such as layered "Ruddlesden Popper" ($K_2NiF_4$-type) phases that include the same AO ((A=Ca, Sr, Ba)—$M_2O_5$ (M=Nb, Ta, Sb)—$B_2O$ (B=Li, Na)) moiety, are provided. An exemplary $A_{n+1}(B_yC_{1-y})O_{3n+1}$ structure is $A_2(Nb_{0.75}B_{0.25})O_4$ (where n=1). It will be apparent to those skilled in the art that both crystalline and amorphous phases with similar composition(s), and layered structures that include the AO moiety can be created.

In some embodiments, the x in the empirical formula $[A(B_yC_{1-y})O_z]_x$ can be greater than, or equal to 1, and can represent extended perovskite-like structures having a common unit cell structure according to the empirical formula given above.

In some embodiments, y is a variable that can range from approximately 0.1 to approximately 0.9, for example, 0.1, 0.2, 0.25, 0.26, 0.27, 0.28, 0.29, 0.3, 0.4, 0.5, 0.6, 0.7, 0.8, or 0.9. In some embodiments, z is a variable that can range from approximately 3 to approximately 5, for example, 3, 3.25, 3.5, 3.75, 4.0, 4.25, 4.5, 4.75 or 5.0. In some embodiments, the net charge of the $(B_yC_{1-y})$ complex is +4, however, the net charge may vary with oxygen content.

FIG. 1 shows x-ray powder diffraction (XRD) spectra for the perovskite-like structure $Ba(Na_{0.25}Nb_{0.75})O_3$ in various environments, including (a) an original, freshly-prepared sample, (b) $CO_2$ at 1,000° C. (exposed in this condition for two days), (c) $H_2$ at 800° C. for two days, and (d) boiling water for five days. The XRD patterns of the samples subjected to the severe environments (b-d) are nearly identical to the freshly-prepared sample (a), indicating excellent chemical stability. FIGS. 7a-c show the powder X-ray diffraction patterns of $Ba_2(Ca_{0.75}Nb_{0.66}Ta_{0.59})O_{6-\delta}$, $Ba_2(Ca_{0.75}Nb_{0.59}Ta_{0.66})O_{6-\delta}$, and $Ba_2(Ca_{0.79}Nb_{0.66}Ta_{0.5})O_{6-\delta}$, prepared at 1,400° C. All the observed diffraction lines could be indexed based on a cubic double perovskite $(A_2B_2O_6)$-like cell (a) with a lattice constant of about $2a_p$ (where $a_p$ is a simple perovskite cell of about 4 Å) (Table 1) and found to be comparable to those of the double perovskite-like structure prepared at 1,500° C. (Bhella & Thangadurai, 2009; Wang & Virkar, 2003).

Figure 4:
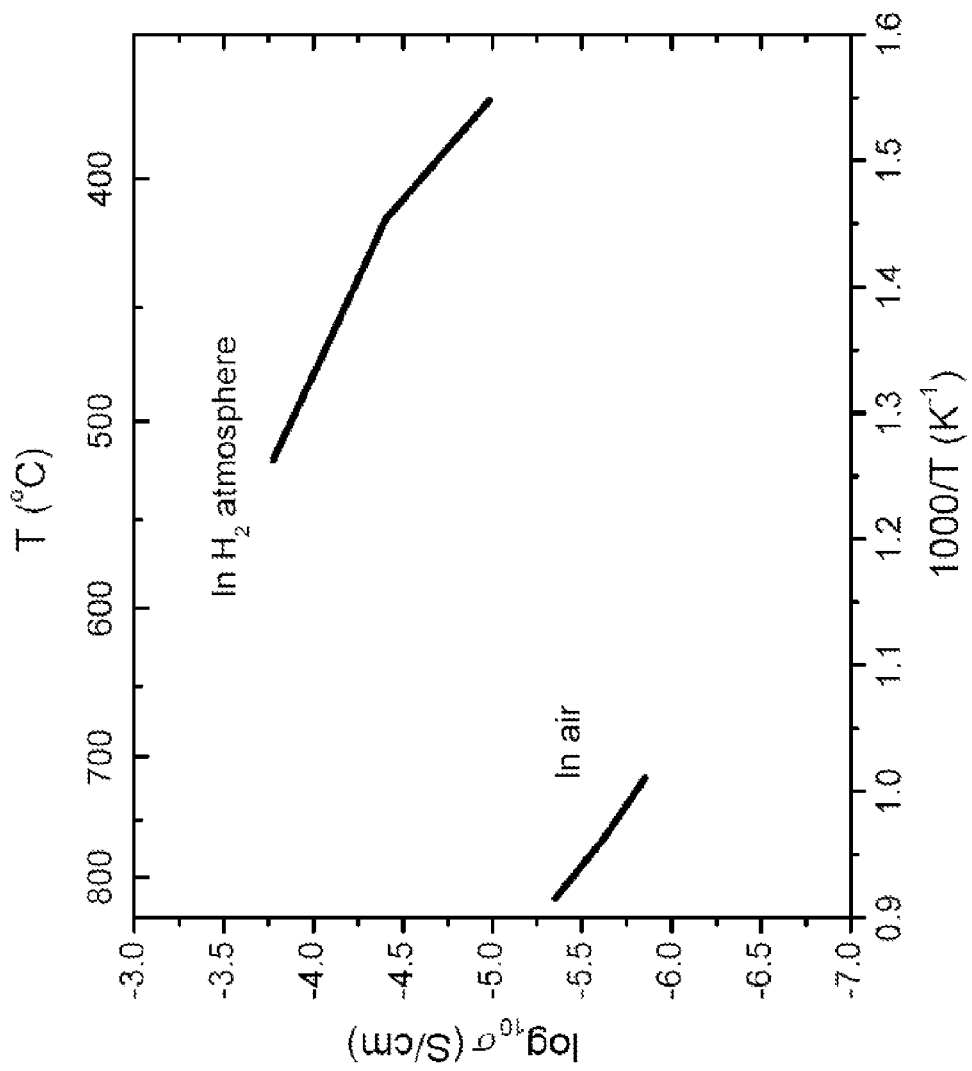
FIG. 4 is a chart showing electrical conductivity for $Ba(Nb_{0.75}Na_{0.25})O_3$ in air and hydrogen atmospheres.
Figure 5:
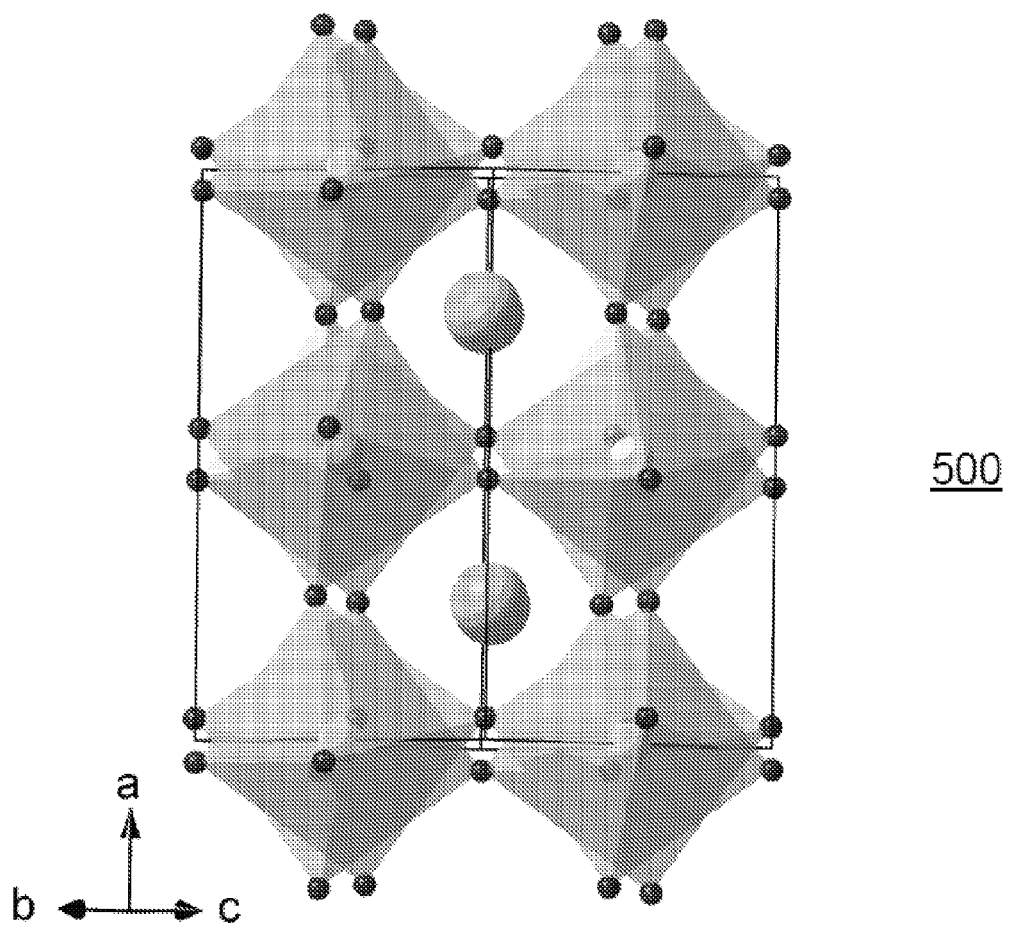
FIG. 5 is an idealized crystal structure of a parent perovskite-like structure, $BaCeO_3$.

FIG. 4 shows electrical conductivity measurements for $Ba(Nb_{0.75}Na_{0.25})O_3$ in air and hydrogen atmospheres. The data indicate a trend of increasing electrical conductivity at elevated temperatures, and also generally indicate higher electrical conductivity at lower temperatures for a given perovskite structure within a hydrogen atmosphere.

FIGS. 8a-f show the SEM images of $Ba_2(Ca_{0.79}Nb_{0.66}Ta_{0.55})O_{6-\delta}$, $Ba_2(Ca_{0.75}Nb_{0.66}Ta_{0.59})O_{6-\delta}$, and $Ba_2(Ca_{0.75}Nb_{0.59}Ta_{0.66})O_{6-\delta}$ prepared at 1,400° C., and for comparison, we also give the images of samples synthesized at 1,500° C. The SEM images show a homogeneous size distribution of particles after sintering at both temperatures, especially for the low-temperature products. Samples prepared at 1,400° C. have the particle size less than about 5 µm, suggesting that final sintering temperature has an effect on the particle size.

FIGS. 9a-b show typical impedance plots in air and wet $N_2$ at 550° C. for $Ba_2(Ca_{0.79}Nb_{0.66}Ta_{0.55})O_{6-\delta}$, $Ba_2(Ca_{0.75}Nb_{0.66}Ta_{0.59})O_{6-\delta}$ and $Ba_2(Ca_{0.75}Nb_{0.59}Ta_{0.66})O_{6-\delta}$ prepared at 1,400° C. and 1,500° C. It was observed that the shape of the impedance plots was highly reproducible during the heating and cooling cycles. The samples sintered at 1,400° C. shows a high total resistance compared to 1,500° C. samples in both air and wet medium (FIGS. 9c,d). At high frequency region (>105 Hz), the resistivity was found to be nearly the same in air, suggesting that bulk conductivity approximately remains constant (FIG. 9c). While in wet medium, the samples sintered at 1,500° C. exhibited slightly higher resistivity compared to the corresponding samples prepared at 1,400° C. (Table 1). AC impedance could be resolved into bulk, grain-boundary, and electrode effects. Unfortunately, these contributions vary significantly with the atmospheres, temperatures and chemical compositions, and is consistent with our recent findings.[22] We could not separate effectively these contributions over the entire temperature region and atmospheres Akin to our previous study, 1 MHz value was used to determine the conductivity for samples sintered at two different temperatures (Bhella & Thangadurai, 2009).

TABLE 2

Total electrical conductivity, activation energy and area specific polarization resistance (ASPR) of Ta-doped BCN, $Ba_2(Ca_{0.79}Nb_{0.66}Ta_{0.55})O_{6-\delta}$, prepared at 1500° C. at 600-800° C. in air and wet (3% $H_2O$) $O_2$.

| | | $\sigma_{total}$ (S/cm) | | ASPR ($\Omega$ cm²) | |
|---|---|---|---|---|---|
| T (° C.) | Electrode | air | wet $O_2$ | air | wet $O_2$ |
| 600 | Pt | $5.2 \times 10^{-4}$ | $3.6 \times 10^{-4}$ | 429 | 345 |
| | SSC | $1.2 \times 10^{-4}$ | $1.6 \times 10^{-4}$ | 1735.5 | 1292 |
| | LSM | $3.8 \times 10^{-4}$ | $6.6 \times 10^{-4}$ | 414.5 | 234 |
| 700 | Pt | $1.0 \times 10^{-3}$ | $8.1 \times 10^{-4}$ | 78 | 123 |
| | SSC | $3.0 \times 10^{-4}$ | $4.3 \times 10^{-4}$ | 682.5 | 466.5 |
| | LSM | $8.1 \times 10^{-4}$ | $1.3 \times 10^{-3}$ | 186.5 | 110.5 |
| 800 | Pt | $1.7 \times 10^{-3}$ | $1.8 \times 10^{-3}$ | 25 | 36 |
| | SSC | $7.4 \times 10^{-4}$ | $1.0 \times 10^{-3}$ | 266.5 | 184.5 |
| | LSM | $1.8 \times 10^{-3}$ | $2.6 \times 10^{-3}$ | 53 | 17.5 |

To prevent reactivity between $CO_2$ and oxygen-deficient materials of the type described herein (e.g., $Ba_2(NaNb)_2O_{5.25}$), a heavy metal atom (e.g., Nb in the preceding formula) can be partially or fully replaced by other metal ions such as Ta or Zr, or other penta- and tetravalent metal ions.

Methods of making the compositions of matter disclosed herein, such as those having an empirical chemical formula $[A(B_yC_{1-y})O_z]_X$, are described in the Examples section. Additional aspects of these methods are further elaborated below, e.g., the affects of preparation temperature on electrical conductivity. In general, the methods provided in the Examples section can be further modified and optimized using the principles and techniques of solid-state chemistry as applied by a person skilled in the art. Such principles and techniques are taught, for example, in *Advanced Inorganic Chemistry*, 6th Edition by F. Albert Cotton, Carlos A. Murillo, and Manfred Bochmann (1999) or Solid State Chemistry and Its Application, by A. R. West, (1989) or in *Reactions and Characterizations of Solids*, by Sandra E Dann (2002), both of which are incorporated herein in their entireties.

Effect of preparation temperature on electrical conductivity of $Ba_2(Ca_{0.75}Nb_{0.59}Ta_{0.66})O_{6-\delta}$, $Ba_2(Ca_{0.75}Nb_{0.66}Ta_{0.59})O_{6-\delta}$ and $Ba_2(Ca_{0.79}Nb_{0.66}Ta_{0.55})O_{6-\delta}$ was investigated in air and humidified $N_2$ and $O_2$. Powder X-ray diffraction (PXRD) showed the formation of double perovskite-type structure. Among these compounds, $Ba_2(Ca_{0.79}Nb_{0.66}Ta_{0.55})O_{6-\delta}$ showed the highest proton conductivity of $3.7 \times 10^{-4}$ S/cm and $5.3 \times 10^{-4}$ S/cm at 550° C. in wet $N_2$, respectively for 1,400° C. and 1,500° C. sintered samples, while no change in conductivity was observed in air. PXRD showed that $Ba_2(Ca_{0.79}Nb_{0.66}Ta_{0.55})O_{6-\delta}$ is stable against chemical reaction

TABLE 1

Lattice constant (a) and electrical conductivity ($\sigma$) of Ta-doped BCN double perovskites.

| | | | $\sigma$ (S/cm) | | | |
|---|---|---|---|---|---|---|
| | | T | Air | | Wet $N_2$ | |
| Compound | a (Å) | (° C.) | 1,400° C. | 1,500° C. | 1,400° C. | 1,500° C. |
| $Ba_2(Ca_{0.75}Nb_{0.66}Ta_{0.59})O_{6-\delta}$ | 8.408 (2) | 400 | $1.7 \times 10^{-4}$ | $1.7 \times 10^{-4}$ | $2.4 \times 10^{-4}$ | $3.1 \times 10^{-4}$ |
| | | 600 | $2.3 \times 10^{-4}$ | $2.5 \times 10^{-4}$ | $2.1 \times 10^{-4}$ | $2.9 \times 10^{-4}$ |
| | | 800 | $8.2 \times 10^{-4}$ | $7.7 \times 10^{-4}$ | $3.6 \times 10^{-4}$ | $4.9 \times 10^{-4}$ |
| $Ba_2(Ca_{0.75}Nb_{0.59}Ta_{0.66})O_{6-\delta}$ | 8.385 (3) | 400 | $8.5 \times 10^{-5}$ | $1.3 \times 10^{-4}$ | $1.4 \times 10^{-4}$ | $2.5 \times 10^{-4}$ |
| | | 600 | $1.7 \times 10^{-4}$ | $2.2 \times 10^{-4}$ | $1.7 \times 10^{-4}$ | $2.5 \times 10^{-4}$ |
| | | 800 | $7.4 \times 10^{-4}$ | $8.9 \times 10^{-4}$ | $2.5 \times 10^{-4}$ | $4.2 \times 10^{-4}$ |
| $Ba_2(Ca_{0.79}Nb_{0.66}Ta_{0.55})O_{6-\delta}$ | 8.390 (4) | 400 | $3.0 \times 10^{-4}$ | $2.4 \times 10^{-4}$ | $3.4 \times 10^{-4}$ | $4.4 \times 10^{-4}$ |
| | | 600 | $3.1 \times 10^{-4}$ | $5.2 \times 10^{-4}$ | $4.3 \times 10^{-4}$ | $6.1 \times 10^{-4}$ |
| | | 800 | $1.4 \times 10^{-3}$ | $1.7 \times 10^{-3}$ | $5.9 \times 10^{-4}$ | $9.1 \times 10^{-4}$ | with $La_{0.8}Sr_{0.2}MnO_3$ (LSM) and $Sm_{0.5}Sr_{0.5}CoO_3$ (SSC) electrodes at 800° C. and 1,000° C. The chemical compatibility was further confirmed by energy dispersive X-ray (EDX) analysis. The AC impedance employing Pt, LSM and SSC electrodes on $Ba_2(Ca_{0.79}Nb_{0.66}Ta_{0.55})O_{6-\delta}$ showed that the area specific polarization resistance (ASPR) decreased in wet atmospheres compared to that of air. Unlike, the oxide ion system, the ASPR was found to be much higher for the presently investigated proton system, suggesting that proton conductivity at the electrolyte and electrode interfaces and or water effusion through microspores appear to control the ASPR. Among the electrodes tested, based on AC impedance studies, the LSM appears to be better electrode compared to SSC for Ta-doped BCN electrolyte.

V. Proton-Exchange Membrane Fuel Cell Based on Perovskite-Like Materials

A device may, in certain embodiments incorporate one or more of the disclosed perovskite-like structures in an energy-conversion system. An example of such as device is a fuel cell. Other device embodiments include gas sensors and pumps, galvanic cells, and devices to capture carbon dioxide.

In one particular embodiment of a fuel cell device, the fuel cell includes a proton exchange membrane configured to transport protons to a cathode side of the fuel cell and an electrically-conductive path connecting an anode to the cathode along which electrons preferentially flow. The proton exchange membrane of the device includes one or more of the disclosed perovskite-like compositions.

Figure 2:
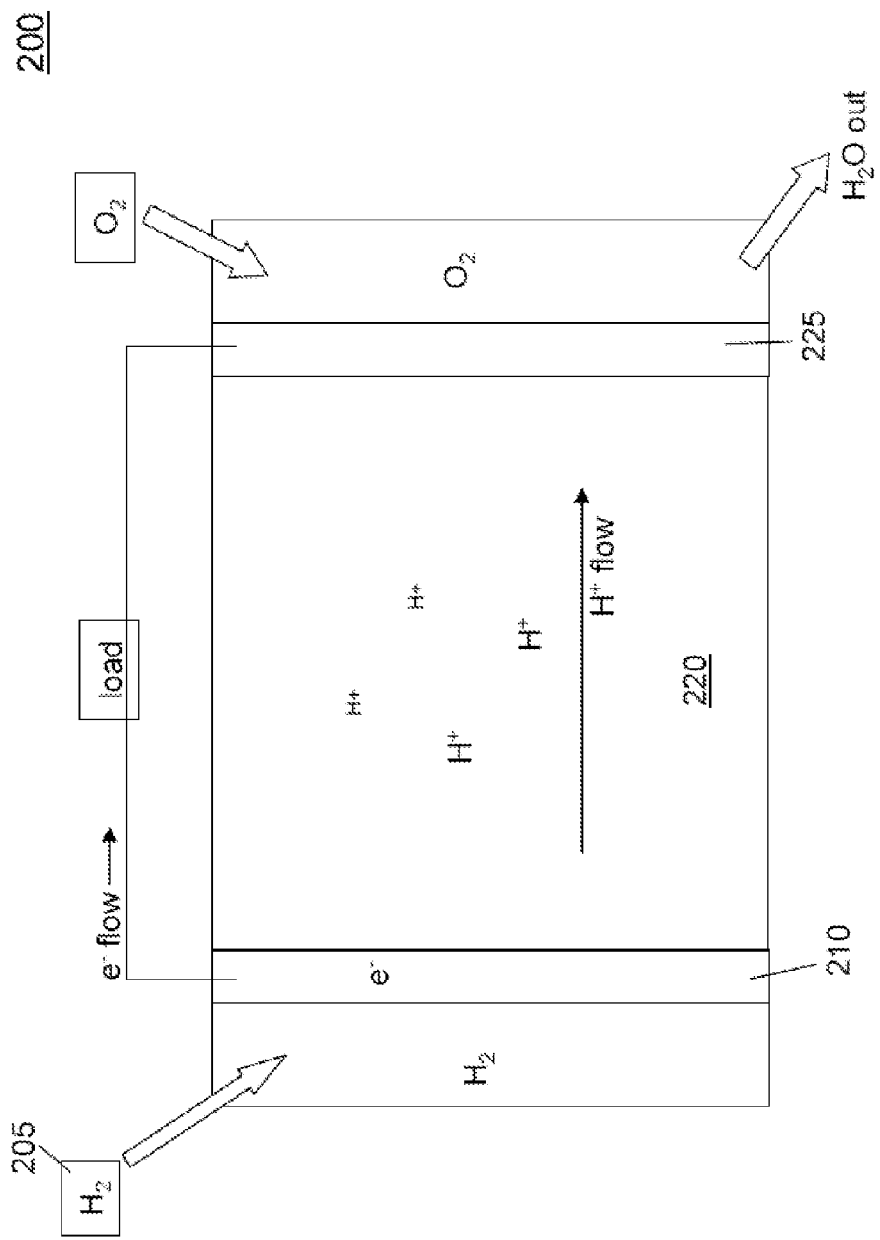
FIG. 2 is a fuel cell incorporating a perovskite-like compound, according to one embodiment.

One embodiment of a proton-exchange membrane fuel cell 200 is shown in FIG. 2. Customary to traditional PEMFC's, a fuel source 205 (hydrogen, in this example) provides a species for an oxidation reaction that occurs at an anode 210. Here, the fuel is oxidized and liberated electrons are conducted along an electrical circuit 215. In most, but not all cases, the oxidation of hydrogen gas is aided through use of a catalyst such as platinum. Remaining protons diffuse through a proton-exchange membrane 220 toward the cathode 225, where a reduction reaction takes place involving the protons and oxygen. The product of the protons and oxygen at the cathode is water and heat, both of which can be managed, or removed from the cell by means known to those skilled in the art of making PEMFC's. In some cases, it may be advantageous to leave an amount of water within the cell to prevent the constituents from drying out.

In one general aspect, referring to FIG. 2, the proton exchange membrane 220 can include analogs of the perovskite-like structure $A(B_yC_{1-y})O_3$ as described above. In some embodiments, C in the preceding composition is Nb. For example, the proton exchange membrane 220 can consist entirely of $Ba(Na_{0.25}Nb_{0.75})O_3$ in solid form. In some embodiments, the perovskite-like structure $A(B_xNb_{1-x})O_3$ may be integrated into a polymer matrix, such as an organic polymer. In some embodiments, the perovskite-like structure $A(B_yNb_{1-y})O_3$ may be integrated into a solid matrix, which can, in some variations, be porous, allowing migration of protons from the anode 210 to the cathode 225. However, in other variations, the solid matrix is not porous. Porous matrices may not be beneficial for some configurations that include electrolytes.

Proton exchange membrane 220 can further include a dopant in addition to the perovskite moiety. A dopant may be capable of interacting with the solid in the exchange of protons. In some embodiments, more than one dopant may be used within a single proton exchange membrane. Examples of dopants can include, for example, any monovalent, divalent, and/or pentavalent cation(s).

In some embodiments, the unit cells of the fuel cell 200 illustrated in FIG. 2 may be joined or stacked together. Stacking fuel cells together is known in the art of fuel cell design to generate a desired electrical current (i.e., power density) for a given application. The fuel cell 200 can produce appreciable electrical conductivity in atmospheres containing hydrogen, including atmospheres containing hydrogen atoms, and atmospheres containing water, including water vapor.

VI. Electrolytes and Electrodes Based on Novel Perovskite-Like Materials

The perovskite-like structures disclosed herein may be used to provide desirable operational characteristics such as chemical stability and ionic, mixed ionic and electronic conductivity in solid state ionic devices for converting chemical energy into electric potential, or storing electrical energy. Examples of such devices include storage devices, such as batteries, fuel cells, electrochromic displays. In addition, the perovskite-like structures disclosed herein may be used in catalysis.

$A(B_yNb_{1-y})O_3$-like perovskites disclosed herein may used as an electrolytes or electrodes in various solid state ionic devices such as fuel cells, gas sensors, electrochromic displays, catalysis, and chemical syntheses. In some embodiments, the optimal temperature range for operating this perovskites may be from about 500° C. to about 800° C. In some embodiments, the these perovskites may be operated up to 1,000° C. In other embodiments, these perovskites may be operated at temperatures above 1,000° C., for example, at about 1,100° C., 1,200° C., 1,300° C., 1,400° C. or 1,500° C.

Figure 3:
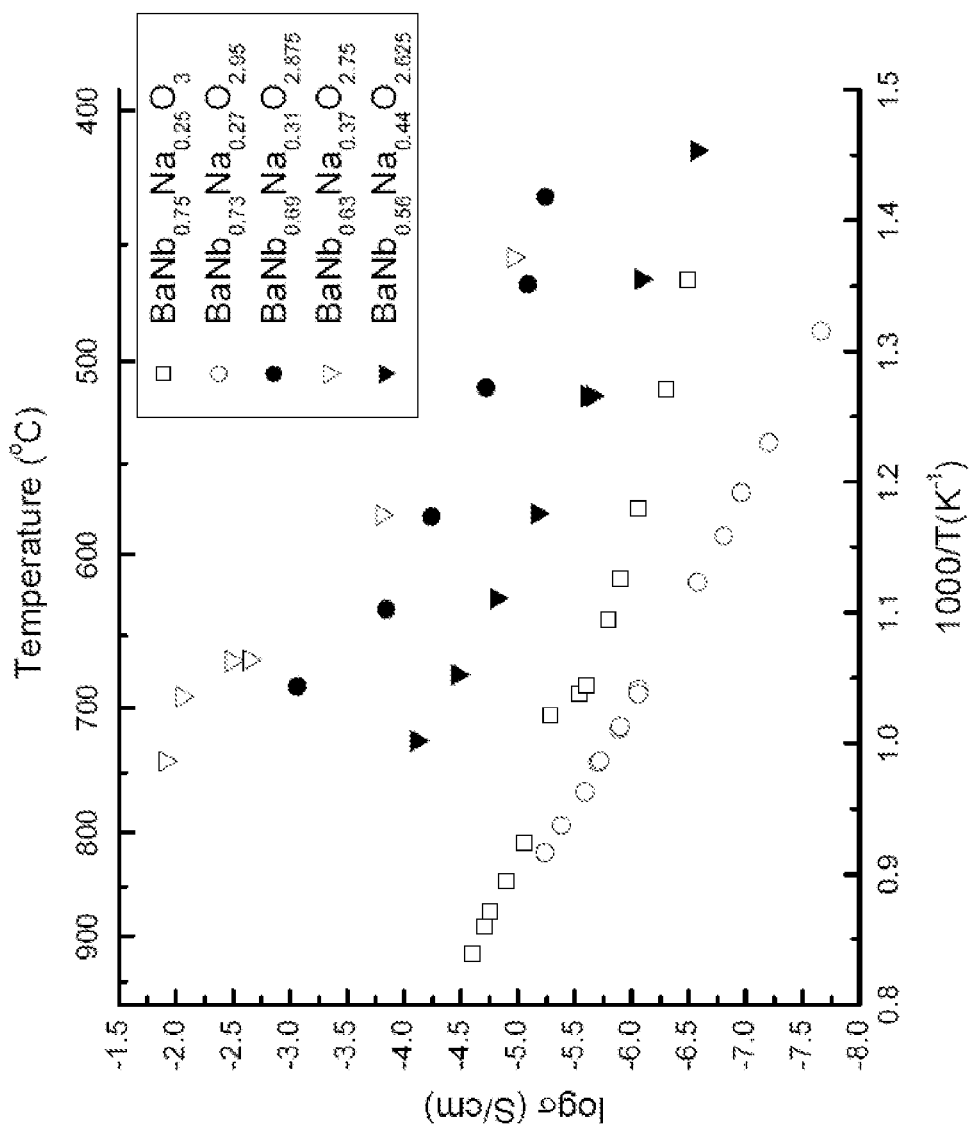
FIG. 3 is a chart showing the electrical conductivity of $Ba(Na,Nb)O_3$ and other perovskite materials.

The electrical conductivity of $Ba(NaNb)O_3$ in ambient air atmosphere and some other perovskite materials are shown in FIG. 3. The data show a general trend of higher electrical conductivity at elevated temperatures for a given perovskite structure.

High temperature ceramic proton conductors can be used for solid-state alternative energy conversion, environment and storage devices, including proton exchange membrane fuel cells, gas sensors (e.g., sensors that detect hydrogen, hydrocarbons, ammonia, etc.), gas pumps (e.g., hydrogen or oxygen gas pumps), electrochromics, hydrogenation of organic compounds, catalysis, and chemical synthesis. Unlike solid oxide fuel cells, an advantage of proton conducting fuel cells is that they produce water at the cathode, and hence reduce fuel dilution at the anode. This is especially advantageous in cases where pure hydrogen fuel is used.

Substitution of Co, Fe, Mn and Mo in $Ba(Na,Nb)O_3$ can be expected to show mixed conduction in air as well as hydrogen containing atmospheres. These mixed conducting materials may be used as electrodes. In some embodiments the mixed conducting materials may be used as electrodes in fuel cells and other ionic devices. The optimized solid electrolyte and electrodes can be used in these applications as thick pellets or thin films.

Any of the perovskite-like and related structures disclosed herein can be integrated into a device to take advantage of the properties of the structures. In some embodiments perovskite-like structures can be integrated into membranes that are then further integrated into a device such as a fuel cell. For example, perovskite-like structures of the type disclosed herein can be used as charge conductors in device applications such as those disclosed in Iwahara et al. (2004), which is hereby incorporated by reference in its entirety.

VII. Examples

The following examples are provided to illustrate general methods for preparing perovskite compounds. The examples are non-limiting with respect to the claims and concepts provided herein. It will be understood that various modifications may be made without departing from the spirit and scope of the disclosure. For example, a general perovskite structures $A(B_yNb_{1-y})O_3$ and $[A(B_yC_{1-y})O_z]_x$ have been discussed above; however, it will be appreciated that similar structures with modifications to the stoichiometry of the general formula are within the scope of the concepts presented herein. For example, the more general perovskite-like structure $A(B_yNb_{1-y})O_{3-x}$ and a layered compositions with the formula $A_{n+1}B_nO_{3n+1}$, where n>1, are considered within the realm of this disclosure. Other pentavalent cations may replace Nb in the general disclosed formula $A(B_yNb_{1-y})O_3$, for example, tantalum (Ta) and antimony (Sb). In general, the disclosed perovskite-like materials may find utility in many applications, including gas sensors, fuel cells, catalysis, chemical synthesis. Accordingly, other embodiments not specifically listed are within the scope of the claims that follow this section.

Electrical conductivity measurements using Pt electrodes were performed in air and in wet (3% $H_2O)N_2$ of double perovskites prepared at 1,400° C. and compared with results obtained for 1,500° C. samples. Pt paste (Heraeus Inc., LP A88-11S, Germany) was applied using a paint-brush to both sides of the sintered pellets and cured at 900° C. for 1 h in air to remove the organic binders. Pt wires were attached to the surface of the pellet using a spring-loaded contact, which served as a current collector. A two probe electrochemical cell was employed for the electrical characterization. The cell was heated to the desired temperature in the range 300-800° C. using a Barnstead tubular furnace (model No. 21100) and held at constant temperature prior to each measurement for a minimum of 2 h and a maximum of 48 h. The AC impedance (Solartron Electrochemical Impedance Spectroscopy; SI model No. 1260, 10-2 Hz-107 MHz) was used to determine the conductivity. The applied AC amplitude was 100 mV. Measurements were made during both heating and cooling cycles to insure reproducibility. Also, the electrical conductivity was measured for a double perovskite $Ba_2(Ca_{0.79}Nb_{0.66}Ta_{0.55})O_{6-\delta}$ synthesized at 1,400° C. and 1,500° C. at 300-800° C. by using $La_{0.8}Sr_{0.2}MnO_3$ (LSM) and $Sm_{0.5}Sr_{0.5}CoO_3$ (SSC) electrodes in air and in wet (3% $H_2O$) $O_2$.

Example 1

Synthesis of $[Sr(Na_{0.25}Nb_{0.75})O_3]_x$ and $[Ba(Na_{0.25}Nb_{0.75})O_3]_x$ by a Ceramic Method In general, the compounds $[Sr(Na_{0.25}Nb_{0.75})O_3]_x$ and $[Ba(Na_{0.25}Nb_{0.75})O_3]_x$ (where x≥1 in both cases) were prepared by solid state reaction using amounts of high purity $NaNO_3$, $Na_2CO_3$, $Sr(NO_3)_2$, $BaCO_3$, and $Nb_2O_5$ in air in a temperature range of 1,000-1,250° C. For example, the compounds $[Sr(Nb_{0.75}Na_{0.25})O_3]_x$ and $[Ba(Na_{0.25}Nb_{0.75})O_3]_x$ (where x≥1 in both cases) were prepared by solid state reaction by reacting 10-15 g of $Ba(NO_3)_2$ or $BaCO_3$ or $Sr(NO_3)_2$; 2 g of $Na_2CO_3$, and 5-9 g of $Nb_2O_5$ at approximately 1,000° C. in air. The mixed powders were ground in a ball mill using zirconia balls in 2-propanol. The mixture was then dried and removed from the ball mill and subjected to heating at 800° C. for 12-15 hours. The reaction mixture was then cooled and once again ground in the ball mill with similar conditions. In the final stage of heat treatment, the reaction mixture was pressed into pellets using an isostatic press and sintered at 1000° C. (in air) for 12 hours. Heating and cooling rates were 10° C. and 5° C. per minute respectively.

$[Sr(Na_{0.25}Nb_{0.75})O_3]_x$ and $[Ba(Na_{0.25}Nb_{0.75})O_3]_x$ (where x≥1) were synthesized using appropriate amounts of $Sr(NO_3)_2$ or $BaCO_3$, and $Nb_2O_5$ and an excess of $Na_2CO_3$ in air, in a temperature range of 1,000-1,250° C. The percentages of excess $Na_2CO_3$ used were: approximately 5%, approximately 10%, approximately 15% and approximately 20%. The excess reagent ($Na_2CO_3$) may be used to prevent the loss of sodium from the lattice in a compound with similar structural stability. Powder X-ray diffraction was performed on all the samples (parent as well as doped) with excess sodium content and the results confirmed that addition of excess sodium to the reaction mixture was not helpful in retaining the original structure.

Example 2

Synthesis of $[Ba_2(Na_{0.7}Nb_{1.3})O_{5.6}]_x$ (x≥1)

The compound $[Ba_2(Na_{0.7}Nb_{1.3})O_{5.6}]_x$ (x≥1) was prepared by solid state reaction by mixing 13.0764 g BaNO3, 8.6365 g $Nb_2O_5$, and 1.8550 g NaCO3 at approximately 1,000° C. in air. The mixed powders were ground in a ball mill using ceramic balls in 2-propanol. The mixture was then dried and removed from the ball mill and subjected to heating at 800° C. for 12-15 hours. The reaction mixture was then cooled and once again ground in the ball mill under similar conditions. In the final stage of heat treatment, the reaction mixture was pressed into pellets using an isostatic press and sintered at 1,000° C. (in air) for 12 hours. Heating and cooling rates were typically 10° C. and 5° C. per minute respectively.

Example 3

Synthesis of a Double Perovskite Oxide

The double perovskite oxides of the nominal chemical formula of $Ba_2(Ca_{0.75}Nb_{0.59}Ta_{0.66})O_{6-\delta}$, $Ba_2(Ca_{0.75}Nb_{0.66}Ta_{0.59})O_{6-\delta}$ and $Ba_2(Ca_{0.79}Nb_{0.66}Ta_{0.55})O_{6-\delta}$ were prepared by employing a conventional ceramic method (mixed oxides solid-state reaction) in air using appropriate amounts of high purity powder materials, such as 17-20 g of $Ba(NO_3)_2$ (99+%, Alfa Aesar), 2-3 g of $CaCO_3$ (99%, Fisher Scientific), 3-4 g of $Nb_2O_5$ (99.5%, Alfa Aesar), and 4-5 g of $Ta_2O_5$ (99.85%, Alfa Aesar). An amount of 2-propanol was added to these starting powdered materials in a ceramic bowl and was ball-milled (Pulverisette, Fritsch, Germany) for 6 h at 200 rpm using ceramic balls with an intermediate change in rotation direction every hour. The powders were then dried and sintered in air at 1,000° C. for 12 h in a clean ceramic crucible. The resulting mixture was ball-milled using 2-propanol again for about 6 h; then pressed into thick pellets (~1 cm diameter, ~2 cm thickness) using isostatic pressure of about 8 MPa. The pressed pellets were sintered in air at two different final temperatures (1,400 and 1,500° C.) for 24 h. After sintering, a few of the pellets were crushed into powder using ball milling for phase characterization by using powder X-ray characterization (PXRD) (Bruker D8 powder X-ray diffractometer (CuKα, 40 kV; 40 mA)) at room temperature with a 2θ step scan width of 0.02 and a counting time of 6 sec. The lattice constant was determined from the PXRD data by least-squares-refinements.

Example 4

Preparation of Electrode Materials $La_{0.8}Sr_{0.2}MnO_3$ and $Sm_{0.5}Sr_{0.5}CoO_3$ The electrode materials with nominal chemical compositions of $La_{0.8}Sr_{0.2}MnO_3$ (LSM) and $Sm_{0.5}Sr_{0.5}CoO_3$ (SSC) were prepared by ceramic reaction in air using the appropriate amounts of high purity materials, such as ca. 19 g of $La_2O_3$ (99.9%, Alfa Aesar), 4 g of $SrCO_3$ (97.5% Alfa Aesar), 13 g of $MnO_2$ (99.6%, Fisher Scientific), ~8 g of $Sm_2O_3$ (99.9% Alfa Aesar), and 24 g of $Co(NO_3)_2.6H_2O$ (99% Fisher Scientific). The rare earth oxides were heated at 800° C. for several days and cooled to room temperature before weighing. The electrode materials were sintered at 1,200° C. for 24 h in air at the final stage in the pellet form. PXRD was used to characterize the phase formation and confirmed the formation of perovskite-type structure.

Example 5

Chemical Reactivity of $Ba_2(Ca_{0.79}Nb_{0.66}Ta_{0.55})O_{6-\delta}$ with LSM and SSC Electrodes The reactivity of electrolyte $Ba_2(Ca_{0.79}Nb_{0.66}Ta_{0.55})O_{6-\delta}$ (prepared at 1,500° C.) was investigated with LSM and SSC electrodes in air at 800 and 1,000° C. for 24 h. About 1:1 weight ratio of electrolyte and electrodes were mixed using ball-mill for 6 h at 200 rpm using zirconia balls. After ball milling, the powders were dried and then pressed into pellets (~1 cm diameter, ~2 cm thickness) to investigate the chemical compatibility. The pellet was crushed into powders after sintering for phase examination. The PXRD and scanning electron microscopy (SEM) (Philips XL30 SEM) coupled with an energy-dispersive X-ray analysis (EDX) were used for phase, microstructure and chemical composition characterization. Au layer was sputtered for the microstructure and elemental analysis was performed without Au layer on powdered samples.

VIII. References

The following references, to the extent that they provide exemplary procedural or other details supplementary to those set forth herein, are specifically incorporated herein by reference.

Adler, *Chem. Rev.*, 104: 4791-4844, (2004).
Azad & Irvine, *Solid State Ionics*, 178: 635-640, (2007).
Azad & Irvine, *Solid State Ionics*, 179: 678-682, (2008).
Badwal, *Solid State Ionics*, 76: 67-80, (1995).
Bhella & Thangadurai, *J. Power Sources*, 186: 311-319, (2009).
Bhide & Virkar, *J. Electrochem. Soc.* 146: 4386-4392, (1999b).
Bhide & Virkar, *J. Electrochem. Soc.*, 146: 2038-2044 (1999a).
Bonanos, *Solid State Ionics*, 145: 265-274, (2001).
Carrillo-Cabrera & Wagner, *Solid State Ionics*, 28-30: 1396-1401, (1988).
Coors, *J. Power Sources*, 118: 150-156, (2003).
Ding et al., *J. Power Sources*, 185: 937-940, (2008).
Dunyushkina & Adler, *J. Electrochem. Soc.*, 152: A2040-A2045, (2005).
Haavik et al., *Solid State Ionics*, 174: 233-243, (2004).
Hammouche et al., *Mater. Res. Bull.*, 24: 367-380, (1989).
Hashimoto et al., *Solid State Ionics*, 176: 1013-1020, (2005).
Huang et al., *J. Electrochem. Soc.* 153: A951-A955, (2006).
Huang et al., *J. Electrochem. Soc.*, 143: 3630-3636, (1996).
Iguchi et al., *Solid state Ionics*, 177: 2381-2384, (2006).
Ishihara et al., *J. Electrochem. Soc.*, 145: 3177-3183, (1998).
Iwahara et al., *Solid State Ionics*, 3-4: 359-363, (1981).
Iwahara et al., *Solid State Ionics*; 168 (2004) 299-310.
Iwahara, *Solid State Ionics*, 77: 289-298, (1995).
Iwahara, *Solid State Ionics*, 86-88: 9-15, (1996).
Kreuer, *Annu. Rev. Mater. Res.*, 33: 333-359, (2003).
Kreuer, *Chem. Mater.*, 8: 610-641 (1996).
Li et al., *J. Power Sources*, 183: 498-505, (2008).
Murray et al., *Solid State Ionics*, 110: 235-243, (1998).
Norby, *Solid State Ionics*, 125: 1-11, (1999).
Nowick et al., *Solid State Ionics*, 125: 303-311, (1999).
Pearce & Thangadurai, *Ionics*, 14: 483-489, (2008).
*Proton Conductors: Solids, Membranes and Gels—Materials and Devices*, Colomban (Ed.), Cambridge University Press, Cambridge, 1992.
Rickert, *Electrochemistry of Solids An Introduction*, Springer, Berlin, 1982.
Sha et al., *J. Alloys and Compounds*, 433: 274-278, (2007).
Sho & Haile, *Nature*, 431: 170-173, (2004).
Skinner, *Fuel Cells Bulletin*, 4: 6-12, (2001).
Tanner & Virkar, *J. Electrochem. Soc.*, 143: 1386-1389, (1996).
Tao & Irvine, *Adv. Mater.*, 18: 1581-1584 (2006).
Tian & Chan, *Solid State Ionics*, 134: 89-102, (2000).
Tu et al., *Solid State Ionics*, 100: 283-288, (1997).
Uchida et al., *Solid State Ionics*, 11: 117-124, (1983).
Valkenberg et al., *Solid State Ionics*, 97: 511-515, (1997).
Wang & Virkar, *J. Electrochem. Soc.*, 150: A92-A97, (2003).
Wu et al., *Solid State Ionics*, 179: 1505-1508, (2008).
Xia & Liu, *Solid State Ionics*, 144: 249-255, (2001).
Xia et al., *Electrochem. Solid-State Lett.*, 4 (5): A52-A54 (2001).
Xia et al., *Solid State Ionics*, 149: 11-19, (2002).
Yamamoto et al., *Solid State Ionics*, 22: 241-246, (1987).
Yoshida et al., *J. Power Sources*, 106: 136-141, (2002).
Zhang et al., *Solid State Ionics*, 159: 121-134, (2003).
Zhang et al., *Solid State Ionics*, 176: 377-384, (2005).
Zhong, *Solid State Ionics*, 178: 213-220, (2007).

The invention claimed is:
1. A composition of matter comprising a compound having an empirical formula $[A(B_yC_{1-y})O_z]_x$ wherein:
A is one or more divalent metal ions;
B is one or more monovalent metal ions;
C is one or more pentavalent metal ions;
O is oxygen; and
$x \geq 1$, $0.1 \leq y \leq 0.9$, $2.5 \leq z \leq 3$.
2. The composition of claim 1, wherein A is calcium, strontium, barium or a combination thereof.
3. The composition of claim 2, wherein A is barium.
4. The composition of claim 2, wherein A is strontium.
5. The composition of claim 1, wherein B is sodium.
6. The composition of claim 1, wherein C is niobium, tantalum, antimony, or a combination thereof.
7. The composition of claim 6, wherein C is niobium.
8. The composition of claim 6, wherein C is a combination of niobium and tantalum.
9. The composition of claim 1, wherein y is from about 0.25 to about 0.30.
10. The composition of claim 1, wherein y is from about 0.30 to about 0.40.

11. The composition of claim 10, wherein y is from about 0.35 to about 0.40.

12. The composition of claim 11, wherein y is from about 0.37 to about 0.40.

13. The composition of claim 12, wherein y is from about 0.375 to about 0.395.

14. The composition of claim 1, wherein x is 2.

15. The composition of claim 1, wherein the compound has the empirical formula $Sr(Na_{0.25}Nb_{0.75})O_3$.

16. The composition of claim 1, wherein the compound has the empirical formula $Ba(Na_{0.25}Nb_{0.75})O_3$.

17. The composition of claim 1, wherein the compound has the empirical formula $[Ba(Ca_y(Nb,Ta)_{1-y})O_z]_2$.

18. The composition of claim 17, wherein the compound has the empirical formula $Ba_2(Ca_{0.75}Nb_{0.59}Ta_{0.66})O_{6-\delta}$, wherein $\delta$ is defined as $0<\delta\leq 1$.

19. The composition of claim 18, wherein $\delta$ is about 0.125.

20. The composition of claim 17, wherein the compound has the empirical formula $Ba_2(Ca_{0.75}Nb_{0.66}Ta_{0.59})O_{6-\delta}$, wherein $\delta$ is defined as $0<\delta\leq 1$.

21. The composition of claim 20, wherein $\delta$ is about 0.125.

22. The composition of claim 17, wherein the compound has the empirical formula $Ba_2(Ca_{0.79}Nb_{0.66}Ta_{0.55})O_{6-\delta}$, wherein $\delta$ is defined as $0<\delta\leq 1$.

23. The composition of claim 22, wherein $\delta$ is about 0.185.

24. The composition of claim 1, wherein x is greater than 1, and wherein said composition comprises crystalline, semi-crystalline, or amorphous character.

25. A composition of matter comprising a compound having an empirical chemical formula $A_x(B_yNb_{1-y})_xO_{3x}$, wherein:

$x\geq 1; 0.1\leq y\leq 0.9$

A comprises one or more divalent metal ions;
B comprises one or more monovalent metal ions; and
O is oxygen.

26. The composition according to claim 1 or 25, wherein the compound is electrically neutral.

27. A device comprising a composition according to claim 1 or 25.

28. The device according to claim 27, wherein the device is configured as a gas sensor.

29. The device according to claim 27, wherein the device is configured as a galvanic cell.

30. The device according to claim 27, wherein the device is configured to capture carbon dioxide.

31. The device according to claim 27, wherein the device is configured as a gas pump.

32. The device according to claim 27, wherein the gas pump is configured to pump oxygen or hydrogen.

33. A proton or mixed proton-electron conductor comprising the composition according to claim 1 or 25.

34. The proton or mixed proton-electron conductor of claim 33, further comprising a dopant or solvent moiety.

35. The proton or mixed proton-electron conductor of claim 33, wherein said empirical chemical formula is $Sr(Na_{0.25}Nb_{0.75})O_3$ or $Ba(Na_{0.25}Nb_{0.75})O_3$.

36. A fuel cell, comprising:
a proton exchange membrane configured to transport protons to a cathode side of said fuel cell; and
an electrically-conductive path connecting an anode to said cathode along which electrons preferentially flow;
wherein the proton exchange membrane comprises the composition according to claim 1 or 25.

37. A method of making a composition of matter according to claim 1 or 25, comprising reacting together:
a first compound comprising a divalent metal ion;
a second compound comprising one or more monovalent metal ions; and
a third compound comprising one or more pentavalent metal ions;
wherein the method results in a composition of matter according to claim 1 or 25.

38. The method of claim 27, wherein the reaction is performed at elevated temperatures.

39. The method of claim 38, wherein the temperature range is from about 1,000° C. to about 1,500° C.

40. The method of claim 39, wherein the temperature range is from about 1,000° C. to about 1,250° C.

41. The method of claim 37, wherein the reaction is performed by a mixed oxide solid state reaction.

* * * * *